United States Patent
Lee et al.

(10) Patent No.: US 11,068,160 B2
(45) Date of Patent: Jul. 20, 2021

(54) ELECTRONIC DEVICE FOR DISPLAYING PICTURE AND CONTROL METHOD THEREFOR

(71) Applicant: Samsung Electronics Co., Ltd., Suwon-si (KR)

(72) Inventors: Dong-Wook Lee, Suwon-si (KR); Min-Ki Choi, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 256 days.

(21) Appl. No.: 16/090,756

(22) PCT Filed: Feb. 6, 2017

(86) PCT No.: PCT/KR2017/001284
§ 371 (c)(1),
(2) Date: Oct. 2, 2018

(87) PCT Pub. No.: WO2017/175962
PCT Pub. Date: Oct. 12, 2017

(65) Prior Publication Data
US 2020/0326845 A1 Oct. 15, 2020

(30) Foreign Application Priority Data
Apr. 5, 2016 (KR) .................. 10-2016-0041562

(51) Int. Cl.
*G06F 3/0488* (2013.01)
*G06F 1/3218* (2019.01)
*G06F 3/041* (2006.01)

(52) U.S. Cl.
CPC ........ *G06F 3/04886* (2013.01); *G06F 1/3218* (2013.01); *G06F 3/0412* (2013.01); *G09G 2330/021* (2013.01)

(58) Field of Classification Search
CPC ....... G06F 3/04886; G06F 2203/04803; G06F 3/0488; G06F 3/04842; G06F 1/3265;
(Continued)

(56) References Cited

U.S. PATENT DOCUMENTS

2007/0268200 A1 11/2007 Fuller et al.
2014/0085221 A1 3/2014 Kim
(Continued)

FOREIGN PATENT DOCUMENTS

KR 10-2011-0040199 A 4/2011
KR 10-2013-0025228 A 3/2013
(Continued)

OTHER PUBLICATIONS

European Search Report dated Feb. 13, 2019, issued in European Patent Application No. 17779263.7.

*Primary Examiner* — Gerald Johnson
(74) *Attorney, Agent, or Firm* — Jefferson IP Law, LLP

(57) ABSTRACT

An electronic device according to various examples of the present invention comprises: a display; a touch sensor for sensing a touch on at least one point of the display device; and a processor, wherein the processor can be configured to: display an always on display picture on a first region of the display; control the remaining region of the display, except for the first region, in an off-state; control the entire region of the display, in the on-state, when the touch on the first region is sensed; and display, on at least a partial region of the display, the picture related to an object corresponding to the location of the touch.

15 Claims, 23 Drawing Sheets

(58) Field of Classification Search
CPC ......... G06F 1/3262; G06F 2203/04105; G06F 1/32; G06F 1/3228; G06F 21/32; G06F 3/017; G06F 3/011; G06F 3/013; G06F 3/0484; G06F 1/3287
See application file for complete search history.

(56) References Cited

U.S. PATENT DOCUMENTS

| | | | |
|---|---|---|---|
| 2014/0333602 A1 | 11/2014 | Yang et al. | |
| 2015/0042570 A1 | 2/2015 | Lombardi et al. | |
| 2015/0082255 A1 | 3/2015 | Devries et al. | |
| 2015/0084873 A1* | 3/2015 | Hagenbuch | G06F 3/0416 345/173 |
| 2015/0324208 A1 | 11/2015 | Keller et al. | |
| 2016/0026425 A1* | 1/2016 | Lee | G06F 3/0416 345/2.2 |
| 2016/0155426 A1* | 6/2016 | Gunn | G09G 5/003 345/522 |
| 2016/0188181 A1* | 6/2016 | Smith | G06F 3/04883 715/765 |
| 2017/0053152 A1* | 2/2017 | Medina | G06K 9/00013 |
| 2017/0068447 A1* | 3/2017 | Hong | G06F 3/04883 |

FOREIGN PATENT DOCUMENTS

| | | |
|---|---|---|
| KR | 10-2013-0043292 A | 4/2013 |
| KR | 10-2014-0039537 A | 4/2014 |
| KR | 10-2014-0089224 A | 7/2014 |
| KR | 10-1477181 B1 | 12/2014 |

* cited by examiner

ELECTRONIC DEVICE FOR DISPLAYING PICTURE AND CONTROL METHOD THEREFOR

CROSS-REFERENCE TO RELATED APPLICATION(S)

This application is a U.S. National Stage application under 35 U.S.C. § 371 of an International application number PCT/KR2017/001284, filed on Feb. 6, 2017, which is based on and claims priority of a Korean patent application number 10-2016-0041562, filed on Apr. 5, 2016, in the Korean Intellectual Property Office, the disclosure of which is incorporated by reference herein in its entirety.

BACKGROUND

1. Field

The present disclosure relates to an electronic device for displaying a screen and a method for controlling the same and, more particularly, to an electronic device for displaying an always-on display (AOD) screen and a method for controlling the same.

2. Description of the Related Art

Portable, small-size electronic devices, such as smartphones and tablet PCs, have become increasingly pervasive in recent years. A smartphone or a tablet PC is manufactured to be small and portable and is capable of executing various applications, such as web browser applications, scheduling applications, music player applications, and email management applications, through which user convenience is maximized A modern electronic device can display an always-on display (AOD) screen. Specifically, the modern electronic device can control a display to turn off when an event set to turn off the display is detected. However, the modern electronic device does not control the entire display to turn off but can display a screen which includes information, for example, the current time or the remaining battery level, on the display. As the electronic device always displays information, for example, the current time or the remaining battery level, on the screen, a user can check the information without manipulating the entire display to turn on.

SUMMARY conventional electronic device can control a touch sensor (for example, a touch panel) corresponding to a display to turn off when displaying an always-on display (AOD) screen, which is used to prevent a user's unintended touch from being processed. Specifically, when the touch sensor is kept on, corresponding to a region of the display where the AOD screen is displayed, a problem may occur wherein an unnecessary operation of processing a sensed touch is performed even though the user merely holds the electronic device. Accordingly, the conventional electronic device that displays the AOD screen is configured to control the touch sensor to turn on when a display on state control command via a home button or the like is detected.

In this case, to identify an event (for example, receipt of a text message) included in the AOD screen, the user first needs to input the display on state control command by pressing the home button and then execute a corresponding application, thereby checking the event.

The present disclosure is devised to solve the foregoing problems or other problems, and various embodiments of the present disclosure may provide an electronic device and a method for controlling the same which are capable of determining whether to process a gesture, such as a touch, input via an AOD screen and processing or ignoring the touch depending on the determination result.

According to various embodiments of the present disclosure, an electronic device may include: a display; a touch sensor configured to sense a touch in at least one point of the display; and a processor, wherein the processor may be configured to: display an always-on display (AOD) screen in a first region of the display; control the remaining region of the display, other than the first region, to turn off; control the entire region of the display to turn on when a touch in the first region is sensed; and display a screen associated with an object corresponding to the position of the touch in at least a portion of the display.

According to various embodiments of the present disclosure, a method for controlling an electronic device may include: displaying an AOD screen in a first region of a display; controlling the remaining region of the display, other than the first region, to turn off; controlling the entire region of the display to turn on when a touch in the first region is sensed; and displaying a screen associated with an object corresponding to the position of the touch in at least a portion of the display.

According to various embodiments of the present disclosure, an electronic device may include: a display; a touch and pressure sensor configured to sense the position and the pressure level of a touch in at least one point of the display; and a processor, wherein the processor may be configured to: display an AOD screen in a first region of the display; control the remaining region of the display, other than the first region, to turn off; control at least a portion of the touch and pressure sensor, corresponding to the position of the AOD screen, to turn on; determine whether the pressure level of the touch exceeds a preset threshold when the touch and the pressure sensor senses the touch; perform a function associated with an object, corresponding to the position of the touch, included in the AOD screen when the pressure level of the touch exceeds the preset threshold; and ignore the touch when the pressure level of the touch is the preset threshold or less.

According to various embodiments of the present disclosure, an electronic device may include: a display; a touch sensor configured to sense a touch in at least one point of the display; and a processor, wherein the processor may be configured to: display an AOD screen in a first region of a display; control the remaining region of the display, other than the first region, to turn off; control at least a portion of the touch sensor, corresponding to the position of the AOD screen, to turn on; determine whether contact between a user and the electronic device corresponds to a preset gesture when the touch sensor senses the contact; perform a function associated with an object, corresponding to the contact, included in the AOD screen when the contact corresponds to the preset gesture; and ignore the contact when the contact does not correspond to the preset gesture.

According to various embodiments of the present disclosure, a method for controlling an electronic device may include: displaying an AOD screen in a first region of a display; controlling the remaining region of the display, other than the first region, to turn off; controlling at least a portion of a touch sensor of the electronic device, corresponding to the position of the AOD screen, to turn on; determining whether contact between a user and the electronic device corresponds to a preset gesture when the touch sensor senses the contact; performing a function associated with an object, corresponding to the contact, included in the AOD screen when the contact corresponds to the preset gesture; and ignoring the contact when the contact does not correspond to the preset gesture.

According to various embodiments of the present disclosure, there may be provided an electronic device and a method for controlling the same which are capable of determining whether to process a gesture, such as a touch, input on an always-on display (AOD) screen and processing or ignoring the touch according to a determination result. Accordingly, a user may simply and immediately input a command with respect to an object included on the AOD screen, thereby optimizing the utilization of the AOD screen.

DETAILED DESCRIPTION

Figure 1:
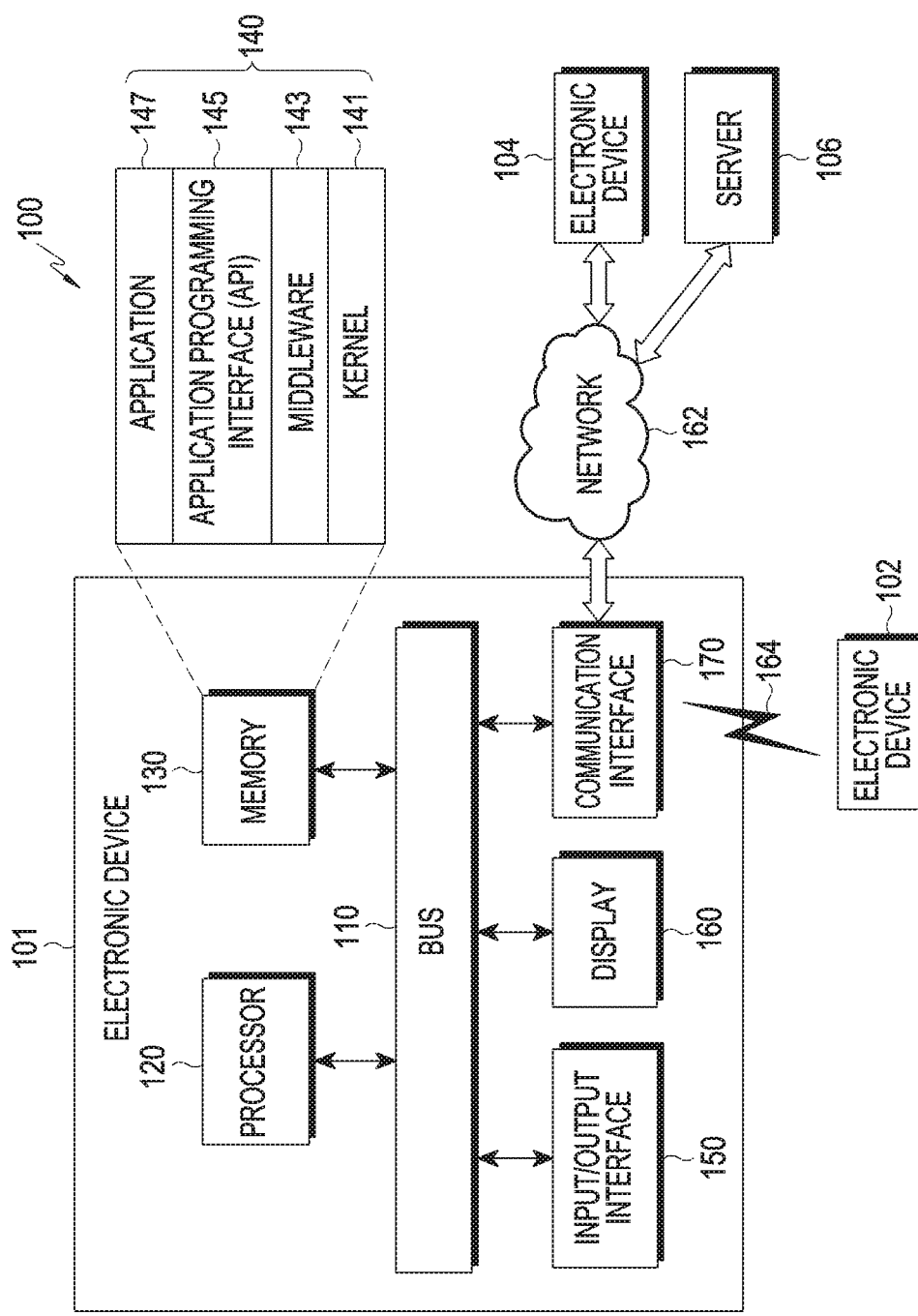
FIG. 1 is a block diagram illustrating an electronic device and a network according to various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

FIG. 1 illustrates an electronic device 101 in a network environment 100 according to various embodiments. The electronic device 101 may include a bus 110, a processor 120, a memory 130, an input/output interface 150, a display 160, and a communication interface 170. In some embodiments, at least one of the components may be omitted, or additional components may be further included in the electronic device 101. The bus 110 may include a circuit that connects the components 110 to 170 to each other and delivers communications (for example, control messages or data) between the components. The processor 120 may include one or more of a Central Processing Unit (CPU), an Application Processor (AP), and a Communication Processor (CP). The processor 120 may control, for example, at least one different component of the electronic device 101, and/or may perform operations relating to communication or data processing.

The memory 130 may include a volatile and/or nonvolatile memory. The memory 130 may store, for example, a command or data related to at least one different component of the electronic device 101. According to one embodiment, the memory 130 may store software and/or a program 140. The program 140 may include, for example, a kernel 141, middleware 143, an Application Programming Interface (API) 145, and/or an application (or "app") 147. At least part of the kernel 141, the middleware 143, and the API 145 may be designated as an operating system. The kernel 141 may control or manage system resources (for example, the bus 110, the processor 120, the memory 130, or the like) used to perform an operation or function implemented in other programs (for example, the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data. Further, the middleware 143 may process one or more requests for operations received from the application 147 according to the priority thereof. For example, the middleware 143 may assign at least one application 147 priority for using system resources of the electronic device 101 (for example, the bus 110, the processor 120, the memory 130, or the like) and may process the one or more requests for operations. The API 145 is an interface for the application 147 to control a function provided from the kernel 141 or the middleware 143, and may include, for example, at least one interface or function (for example, a command) for file control, window control, image processing, or text control. The input/output interface 150 may deliver a command or data, which is input from, for example, a user or a different external device, to a different component(s) of the electronic device 101 or may output a command or data, which is received from a different component(s) of the electronic device 101, to the user or to the different external device.

The display 160 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 160 may display, for example, various types of content (for example, text, an image, a video, an icon, and/or a symbol) for the user. The display 160 may include a touch screen and may receive touch, gesture, proximity, or hovering input using, for example, an electronic pen or a body part of a user. The communication interface 170 may establish communication, for example, between the electronic device 101 and an external device (for example, a first external electronic device 102, a second external electronic device 104, or a server 106). For example, the communication interface 170 may be connected to a network 162 via wireless communication or wired communication to communicate with the external device (for example, the second external electronic device 104 or the server 106).

The wireless communication may include cellular communication using, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). According to one embodiment, the wireless communication may include, for example, at least one of Wireless Fidelity (Wi-Fi), Bluetooth, Bluetooth Low Energy (BLE), ZigBee, Near-Field Communication (NFC), Magnetic Secure Transmission, Radio Frequency (RF), and a Body Area Network (BAN). According to one embodiment, the wireless communication may include a Global Navigation Satellite System (GNSS). The GNSS may be, for example, a Global Positioning System (GPS), a Global Navigation Satellite System (GNSS), a BeiDou Navigation Satellite System (hereinafter, "BeiDou"), or Galileo, which is the European global satellite-based navigation system. In the present document, "GPS" may be interchangeably used with "GNSS" hereinafter. The wired communication may include, for example, at least one of Universal Serial Bus (USB), High-Definition Multimedia Interface (HDMI), Recommended Standard 232 (RS-232), power-line communication, and Plain Old Telephone Service (POTS). The network 162 may include a telecommunications network, which may be, for example, at least one of a computer network (for example, a Local Area Network (LAN) or Wide Area Network (WAN)), the Internet, and a telephone network.

Each of the first and second external electronic devices 102 and 104 may be a device of a type that is the same as, or different from, that of the electronic device 101. According to various embodiments, all or some of the operations performed in the electronic device 101 may be performed in another electronic device or a plurality of electronic devices (for example, the electronic devices 102 and 104 or the server 106). According to one embodiment, when the electronic device 101 needs to perform a function or service automatically or upon request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional functions and may transmit the result thereof to the electronic device 101. The electronic device 101 may provide the requested function or service using the received result without change or after additionally processing the result. To this end, cloud-computing, distributed-computing, or client-server-computing technologies may be used.

According to various embodiments of the present disclosure, the processor 120 may configured to: display an always-on display (AOD) screen in a first region of the display 160; control a remaining region of the display, other than the first region, to turn off; control an entire region of the display to turn on when a touch in the first region is sensed; and display a screen associated with an object corresponding to the position of the touch in at least a portion of the display. When a user touches one point of the display 160, a touch sensor (not shown) may sense the point where the user touches. The touch sensor (not shown) will be described in detail later.

According to various embodiments of the present disclosure, the processor 120 may configured to: control the touch sensor to turn off while the AOD screen is displayed; and control at least a portion of the touch sensor to turn on to sense the touch when an event set for the touch sensor to perform touch sensing is detected.

According to various embodiments of the present disclosure, the processor 120 may configured to: detect a case where the pressure level of the touch exceeds a preset threshold of the event set to perform touch sensing; and control at least the portion of the touch sensor to turn on. Here, a pressure sensor (not shown) may sense the pressure level of the touch and may transmit the pressure level of the touch to the processor 120. It will be easily understood by those skilled in the art that the type and the position of a disposed pressure sensor are not limited as long as the pressure sensor (not shown) is capable of sensing the pressure level applied by a user to the surface of the display 160 or glass when the user presses one point of the display 160.

According to various embodiments of the present disclosure, the processor 120 may configured to: analyze an image captured by a camera (not shown); detect a case where a user looks at the display as the event set to perform touch sensing using the result of analyzing the captured image; and control at least the portion of the touch sensor to turn on.

According to various embodiments of the present disclosure, the processor 120 may configured to: detect an event for adding a new object to the AOD screen as the event set to perform touch sensing; and control at least the portion of the touch sensor to turn on.

According to various embodiments of the present disclosure, the processor 120 may configured to: control at least the portion of the touch sensor, corresponding to the position of the new object, to turn on; and perform a function associated with the new object when a touch is detected in at least the portion of the touch sensor controlled to turn on.

According to various embodiments of the present disclosure, the processor 120 may configured to: control at least a portion of the touch sensor, corresponding to the position of the AOD screen, to turn on, and determine the position of the touch detected in at least the portion of the touch sensor when an event set for the touch sensor to perform touch sensing is detected.

According to various embodiments of the present disclosure, the processor 120 may configured to: detect a case where the pressure level of the touch exceeds a preset threshold as the event set to perform touch sensing; and determine the position of the touch detected in at least the portion of the touch sensor.

According to various embodiments of the present disclosure, the processor 120 may configured to: analyze an image captured by the camera (not shown); detect a case where a user looks at the display as the event set to perform touch sensing using the result of analyzing the captured image; and determine the position of the touch detected in at least the portion of the touch sensor.

According to various embodiments of the present disclosure, the processor 120 may configured to: detect an event for adding a new object to the AOD screen as the event set to perform touch sensing; and determine the position of the touch detected in at least the portion of the touch sensor.

According to various embodiments of the present disclosure, the processor 120 may configured to ignore the touch detected in at least the portion of the touch sensor when the event set for the touch sensor to perform touch sensing is not detected.

According to various embodiments of the present disclosure, the electronic device 101 may further include a touch and pressure sensor (not shown) configured to sense the position and the pressure level of a touch in at least one point of the display 160. The processor 120 may be configured to: display an AOD screen in a first region of the display 160; control the remaining region of the display, other than the first region, to turn off; control at least a portion of the touch and pressure sensor, corresponding to the position of the AOD screen, to turn on; determine whether the pressure level of the touch exceeds a preset threshold when the touch and the pressure sensor senses the touch; perform a function associated with an object, corresponding to the position of the touch, included in the AOD screen when the pressure level of the touch exceeds the preset threshold; and ignore the touch when the pressure level of the touch matches the preset threshold or less.

According to various embodiments of the present disclosure, the processor 120 may configured to: display an AOD screen in a first region of the display 160; control the remaining region of the display, other than the first region, to turn off; control at least a portion of the touch sensor, corresponding to the position of the AOD screen, to turn on; determine whether contact between a user and the electronic device corresponds to a preset gesture when the touch sensor senses the contact; perform a function associated with an object, corresponding to the contact, included in the AOD screen when the contact corresponds to the preset gesture; and ignore the contact when the contact does not correspond to the preset gesture.

Figure 2:
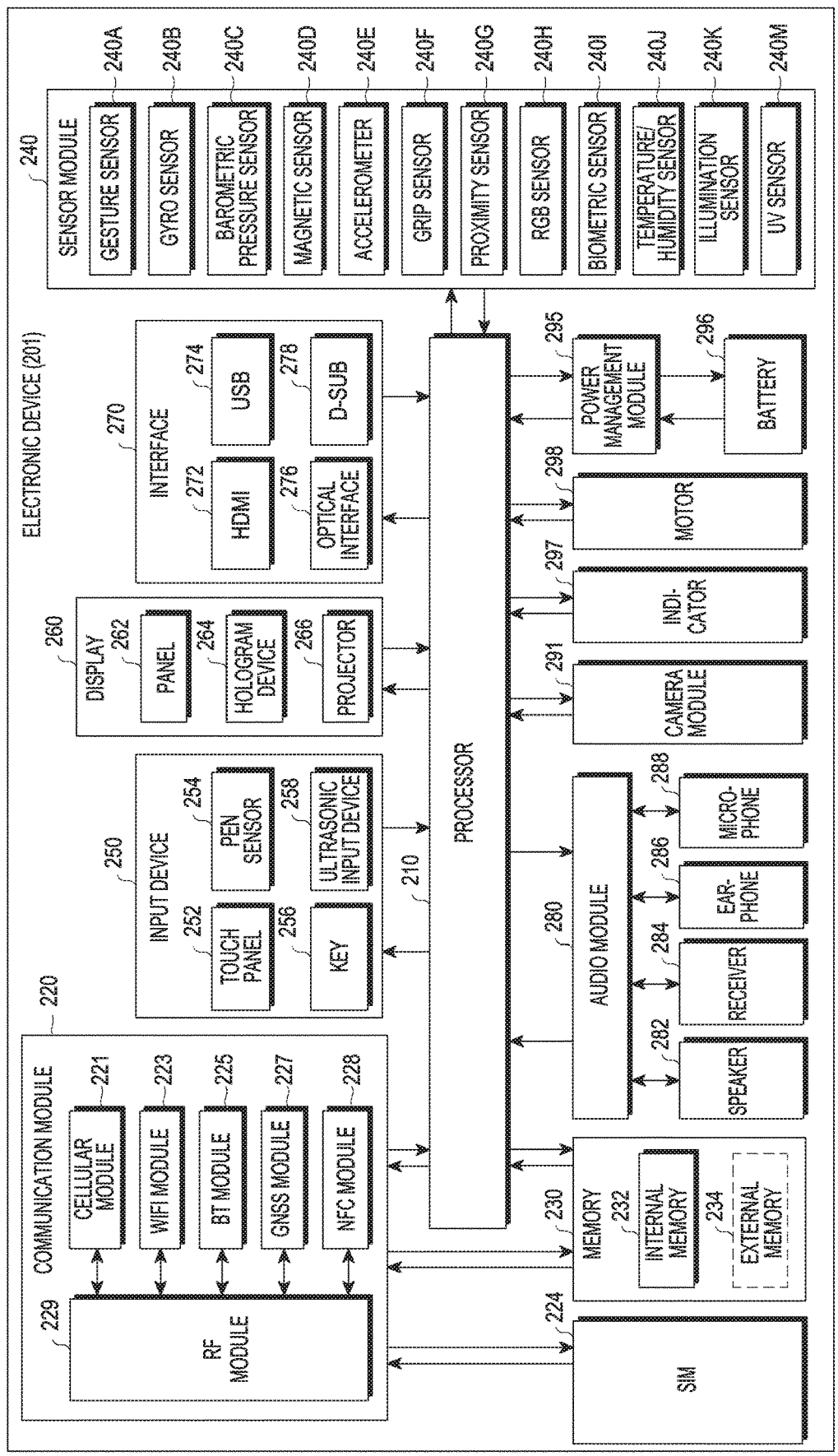
FIG. 2 is a block diagram illustrating an electronic device according to various embodiments.

FIG. 2 is a block diagram illustrating an electronic device 201 according to various embodiments. The electronic device 201 may include, for example, all or part of the electronic device 101 illustrated in FIG. 1. The electronic device 201 may include one or more processors (for example, APs) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processors 210 may run, for example, an operating system or an application to control a plurality of hardware or software components that are connected to the processors 210, and may perform various kinds of data processing and operations. The processors 210 may be configured as, for example, a System on Chip (SoC). According to one embodiment, the processors 210 may further include a Graphic Processing Unit (GPU) and/or an image signal processor. The processors 210 may include at least some (for example, a cellular module 221) of the components illustrated in FIG. 2. The processors 210 may load a command or data received from at least one of other components (for example, nonvolatile memory) into volatile memory to process the command or data, and may store resulting types of data in the nonvolatile memory.

The communication module 220 may have a configuration that is the same as, or similar to, that of the communication interface 170. The communication module 220 may include, for example, a cellular module 221, a Wi-Fi module 223, a Bluetooth (BT) module 225, a GNSS module 227, a Near-Field Communication (NFC) module 228, and an RF module 229. The cellular module 221 may provide, for example, a voice call, a video call, a text messaging service, or an Internet service through a communication network. According to one embodiment, the cellular module 221 may perform identification and authentication of the electronic device 201 in a communication network using a Subscriber Identity Module (SIM, for example, a SIM card) 224. According to one embodiment, the cellular module 221 may perform at least some of the functions provided by the processors 210. According to one embodiment, the cellular module 221 may include a Communication Processor (CP). According to one embodiment, at least some (for example, two or more) of the cellular module 221, the Wi-Fi module 223, the BT module 225, the GNSS module 227, and the NFC module 228 may be included in one Integrated Chip (IC) or IC package. The RF module 229 may transmit and receive, for example, a communication signal (for example, an RF signal). The RF module 229 may include, for example, a transceiver, a Power Amplifier (amp) Module (PAM), a frequency filter, a Low-Noise Amplifier (LNA), an antenna, or the like. According to another embodiment, at least one of the cellular module 221, the Wi-Fi module 223, the BT module 225, the GNSS module 227, and the NFC module 228 may transmit and receive an RF signal through a separate RF module. The SIM 224 may include, for example, a card including a SIM or an embedded SIM, and may include unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a DRAM, a SRAM, a SDRAM, or the like) and a nonvolatile memory (for example, a OTPROM, a PROM, an EPROM, an EEPROM, a mask ROM, a flash ROM, a flash memory, a hard drive, or a Solid-State Drive (SSD)). The external memory 234 may include a flash drive, for example, a Compact Flash (CF), a Secure Digital (SD), a micro-SD, a mini-SD, an extreme digital (xD), a Multi-Media Card (MMC), a memory stick, or the like. The external memory 234 may be functionally or physically connected to the electronic device 201 through any of various interfaces.

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor configured, as a part of the processors 210 or separately from the processors 210, to control the sensor module 240, thereby controlling the sensor module 240 while the processors 210 are in a sleep state. The sensor module 240 may further include a pressure sensor (not shown), and the pressure sensor (not shown) may sense the level of pressure exerted by a user to a display when the user presses the display. The pressure sensor (not shown) may be configured as hardware separate from a touch panel 252 or a pen sensor 254 or may be configured in a single body with the touch panel 252 or the pen sensor 254 depending on the configuration.

The input device 250 may include, for example, a touch panel 252, a (digital) pen sensor 254, a key 256, or an ultrasonic input device 258. The touch panel 252 may be, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response. The (digital) pen sensor 254 may, for example, be part of the touch panel or may include a separate recognition sheet. The key 256 may include, for example, a physical button, an optical key, or a keypad. The ultrasonic input device 258 may detect ultrasonic waves, generated from an input tool, via a microphone (for example, a microphone 288) in the electronic device 201 and may identify data. Hereinafter, at least one of the touch panel 252 and the pen sensor 254 may be referred to as a touch sensor.

The display 260 (for example, the display 160) may include a panel 262, a hologram device 264, a projector 266, and/or a control circuit to control these components. The panel 262 may be configured, for example, to be flexible, transparent, or wearable. The panel 262 may be formed with the touch panel 252 in one or more modules. According to one embodiment, the panel 262 may include a pressure sensor (or force sensor) to measure the strength of pressure of a user's touch. The pressure sensor may be formed with the touch panel 252 in a single body, or may be provided as one or more sensors separate from the touch panel 252. The hologram device 264 may display a three-dimensional image in the air using light interference. The projector 266 may project light onto a screen to display an image. The screen may be disposed, for example, inside or outside the electronic device 201. The interface 270 may include, for example, a HDMI 272, a USB 274, an optical interface 276, or a D-subminiature (D-sub) interface 278. The interface 270 may be included, for example, in the communication interface 170 illustrated in FIG. 1. Additionally or alternatively, the interface 270 may include, for example, a Mobile High-Definition Link (MHL) interface, a SD card/Multi-Media Card (MMC) interface, or an Infrared Data Association (IrDA) interface.

The audio module 280 may bidirectionally convert, for example, a sound and an electrical signal. At least some components of the audio module 280 may be included, for example, in the input/output interface 145 illustrated in FIG. 1. The audio module 280 may process sound information input or output, for example, through a speaker 282, a receiver 284, earphones 286, or the microphone 288. The camera module 291 is a device that takes, for example, a still image and a video. According to one embodiment, the camera module 291 may include one or more image sensors (for example, a front sensor or a rear sensor), a lens, an Image Signal Processor (ISP), or a flash (for example, an LED, a xenon lamp, or the like). The power management module 295 may manage, for example, the power of the electronic device 201. According to one embodiment, the power management module 295 may include a Power Management Integrated Circuit (PMIC), a charger IC, or a battery or fuel gauge. The PMIC may have wired and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 may display the specific state of the electronic device 201 or a component thereof (for example, the processors 210), which may be, for example, a booting state, a message state, or a charging state. The motor 298 may convert an electrical signal into mechanical vibrations, and may generate vibrations or a haptic effect. The electronic device 201 may include a mobile TV support device (for example, a GPU) that is capable of processing media data in accordance with, for example, Digital Multimedia Broadcasting (DMB), Digital Video Broadcasting (DVB), or mediaFlo™ standards. Each element mentioned in the present document may include one or more components, and may be designated by different terms depending on the type of the electronic device. In various exemplary embodiments, an electronic device (for example, the electronic device 201) may be configured such that some elements are omitted, additional elements are further included, or some of the elements are combined into one entity, which may perform the same functions as those of the corresponding elements before combination.

Figure 3:
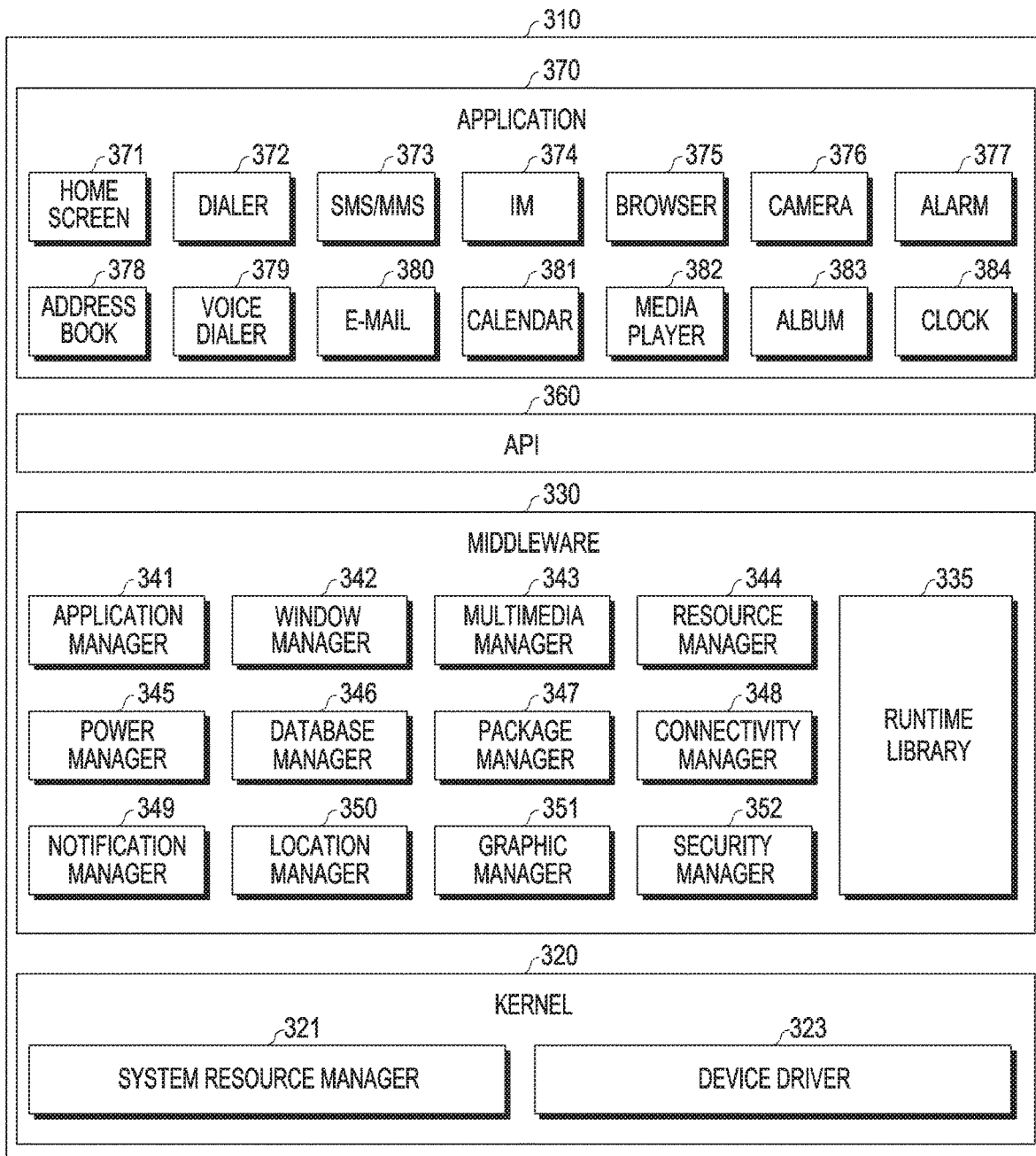
FIG. 3 is a block diagram illustrating a program module according to various embodiments.

FIG. 3 is a block diagram illustrating a program module according to various embodiments. According to one embodiment, the program module 310 (for example, the program 140) may include an operating system that controls resources related to an electronic device (for example, the electronic device 101) and/or various applications (for example, the application 147) that run on the operating system. The operating system may be, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or an application 370 (for example, the application 147). At least part of the program module 310 may be preloaded onto the electronic device, or may be downloaded from an external electronic device (for example, the electronic device 102 or 104 and the server 106).

The kernel 320 may include, for example, a system resource manager 321 and/or a device driver 323. The system resource manager 321 may perform control, allocation, or recovery of system resources. According to one embodiment, the system resource manager 321 may include a process management unit, a memory management unit, or a file-system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide, for example, functions commonly needed for applications 370, or may provide the applications 370 with various functions through the API 360 so that the applications 370 may use the limited systems resources in the electronic device. According to one embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier to add a new function through a programming language while the application 370 is running. The runtime library 335 may perform input/output management, memory management, or arithmetic function processing. The application manager 341 may manage, for example, the life cycle of the application 370. The window manager 342 may manage Graphic User Interface (GUI) resources used for a screen. The multimedia manager 343 may identify formats that are necessary to play media files, and may encrypt or decrypt a media file using a codec suitable for a corresponding format. The resource manager 344 may manage source code or memory space for the application 370. The power manager 345 may manage, for example, the capacity or power supply of a battery and may provide information on power necessary for the operation of the electronic device. According to one exemplary embodiment, the power manager 345 may interwork with a Basic Input/Output System (BIOS). The database manager 346 may generate, retrieve, or change a database to be used for, for example, the application 370. The package manager 347 may manage the installation or updating of an application distributed in the form of a package file.

The connectivity manager 348 may manage, for example, wireless connectivity. The notification manager 349 may provide a user with an event, for example, an incoming message, an appointment, and a proximity notification. The location manager 350 may manage, for example, information about the location of the electronic device. The graphic manager 351 may manage, for example, a graphic effect to be provided for the user or a user interface related to the graphic effect. The security manager 352 may provide, for example, system security or user authentication. According to one exemplary embodiment, the middleware 330 may include a telephony manager to manage a voice or video call function of the electronic device or a middleware module that is capable of forming combinations of functions of the foregoing elements. According to one exemplary embodiment, the middleware 330 may provide a specialized module for each operating system. The middleware 330 may dynamically delete some of the existing elements or add new elements. The API 360 is, for example, a set of API programming functions, and may be provided with a different configuration depending on the operating system. For example, one API set for each platform may be provided in Android or iOS, while two or more API sets for each platform may be provided in Tizen.

The application 370 may include, for example, a home screen 371, a dialer 372, an SMS/MMS 373, Instant Messaging (IM) 374, a browser 375, a camera 376, an alarm 377, an address book 378, a voice dialer 379, email 380, a calendar 381, a media player 382, an album 383, a clock 384, a healthcare application (for example, for measuring exercise or blood sugar), or an environmental data application (for example, for providing atmospheric pressure, humidity, or temperature data). According to one exemplary embodiment, the application 370 may include an information exchange application that is capable of supporting information exchange between the electronic device and an external electronic device. The information exchange application may include, for example, a notification relay application for relaying specific information to the external electronic device or a device management application for managing the external electronic device. For example, the notification relay application may relay notification information, which is generated in another application of the electronic device, to the external electronic device, or may receive notification information from the external electronic device and provide the notification information to the user. The device management application may install, delete, or update, for example, a function (for example, a function of turning on/turning off the external electronic device itself (or some components thereof) or adjusting the brightness (or resolution) of a display) of an external electronic device communicating with the electronic device or an application operating in the external electronic device. According to one exemplary embodiment, the application 370 may include an application (for example, a healthcare application of a mobile medical device) assigned according to the attributes of the external electronic device. According to one exemplary embodiment, the application 370 may include an application received from the external electronic device. At least part of the program module 310 may be implemented (for example, run) by software, firmware, hardware (for example, the processors 210), or combinations of at least two or more thereof, and may include a module, a program, a routine, sets of instructions, or a process to perform one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Hereinafter, the electronic device 101 performing execution may be understood such that the processor 120 included in the electronic device 101 executes an instruction. In addition, the electronic device 101 performing detection may be understood such that the processor 120 obtains information on an event detected by other hardware or executes an instruction to obtain information, or sensing hardware detects a particular event. Further, the electronic device 101 making a determination or judgment may be understood such that the processor 120 applies a pre-stored algorithm or program to execute an instruction to obtain a particular result. Moreover, that the electronic device 101 performs control may be interpreted such that the processor 120 executes an instruction to control other hardware. In addition, it will be easily understood by those skilled in the art that such instructions are stored in the memory 130.

Figure 4A:
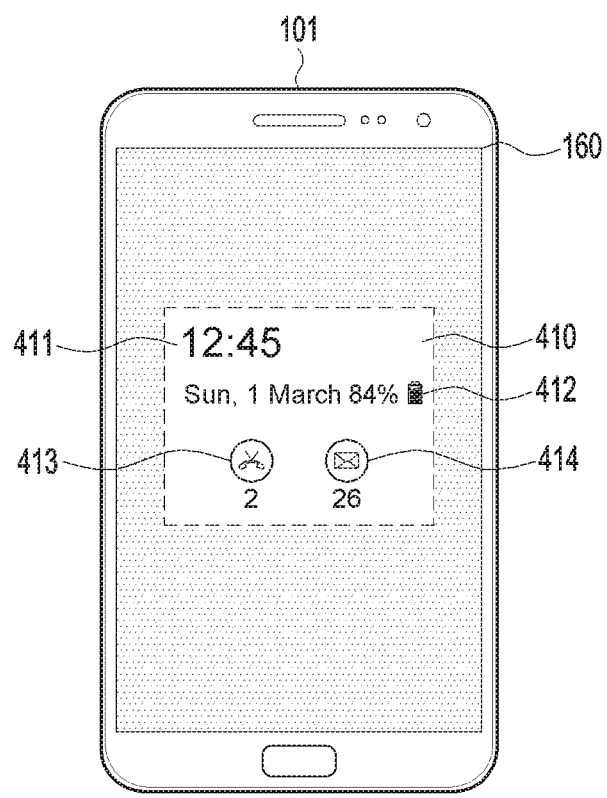
FIGS. 4A and 4B illustrate an always-on display screen according to various embodiments of the present disclosure.
Figure 4B:
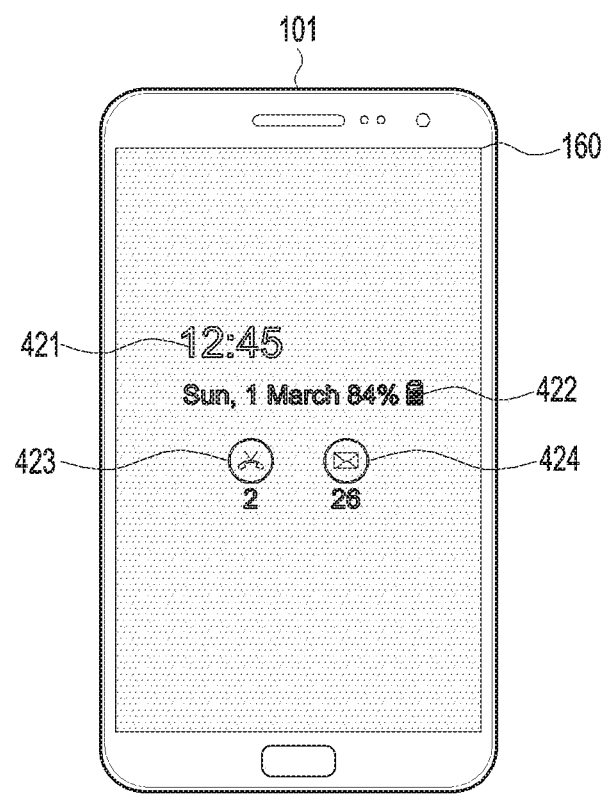

FIGS. 4A and 4B illustrate an always-on display (AOD) screen according to various embodiments of the present disclosure.

Referring to FIG. 4A, an electronic device 101, according to various embodiments of the present disclosure, may control at least a portion of a display 160 to turn off. Specifically, the electronic device 101 may control at least some of a plurality of light sources corresponding to respective pixels of the display 160 to turn off, so that no screen may be displayed on at least a portion of the display 160. More specifically, the display 160, according to various embodiments of the present disclosure, may include a light source (for example, AMOLED) corresponding to each pixel, and each light source may be controlled to turn on or turn off. Accordingly, the electronic device 101 may control at least a portion of the display 160 to turn off.

The electronic device 101 may display an always-on display (AOD) screen in a first region 410 of the display 160. Specifically, the electronic device 101 may apply power to at least some of the light sources so as to display the AOD screen in the first region 410 of the display 160. The first region 410 may be changed over time, thereby preventing burnout.

The AOD screen may include the current time 411, the remaining battery level 412, and an indicator associated with an application (for example, an indicator 413 indicating a missed call associated with a phone application and an indicator 414 indicating a received text associated with a text application), and those skilled in the art can easily understand that there is no limitation as to information displayed on the AOD screen.

Although it is shown in FIG. 4A that the electronic device 101 maintains all pixels in first region 410 of the display 160 to turn on, this is merely an example. Referring to FIG. 4B, the electronic device 101 may determine only a minimum number of pixels for displaying information as a first region and may thus control the light sources such that only pixels for displaying the current time 421, the remaining battery level 422, and indicators 423 and 424 associated with an application are turned on.

Figure 5A:
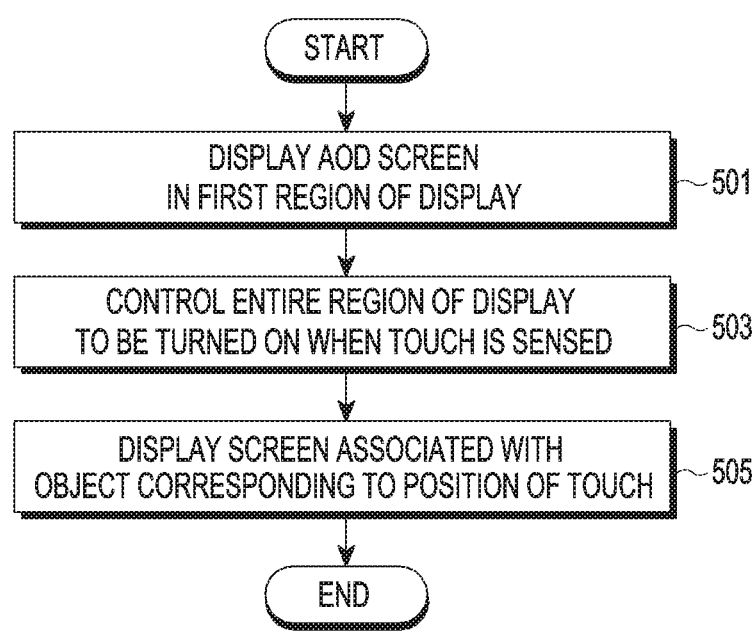
FIG. 5A is a flowchart illustrating a method for controlling an electronic device according to various embodiments of the present disclosure.

FIG. 5A is a flowchart illustrating a method for controlling an electronic device according to various embodiments of the present disclosure.

In operation 501, the electronic device 101 may display an AOD screen in a first region of a display 160 and may control the remaining region of the display other than the first region to turn off.

In operation 503, the electronic device 101 may control the entire region of the display 160 to turn on when a touch in the first region is sensed.

In operation 505, the electronic device 101 may display a screen associated with an object corresponding to the position of the touch in at least a portion of the display 160. For example, the electronic device 101 may display the screen associated with the object corresponding to the position of the touch under a first condition. On the other hand, the electronic device 101 may ignore a touch under a second condition. Specifically, even though the touch is sensed, the electronic device 101 may not process the sensed touch or may control a touch sensor that senses a touch to turn off. The respective conditions and a configuration in which the electronic device 101 ignores a touch will be described later in detail.

Figure 5B:
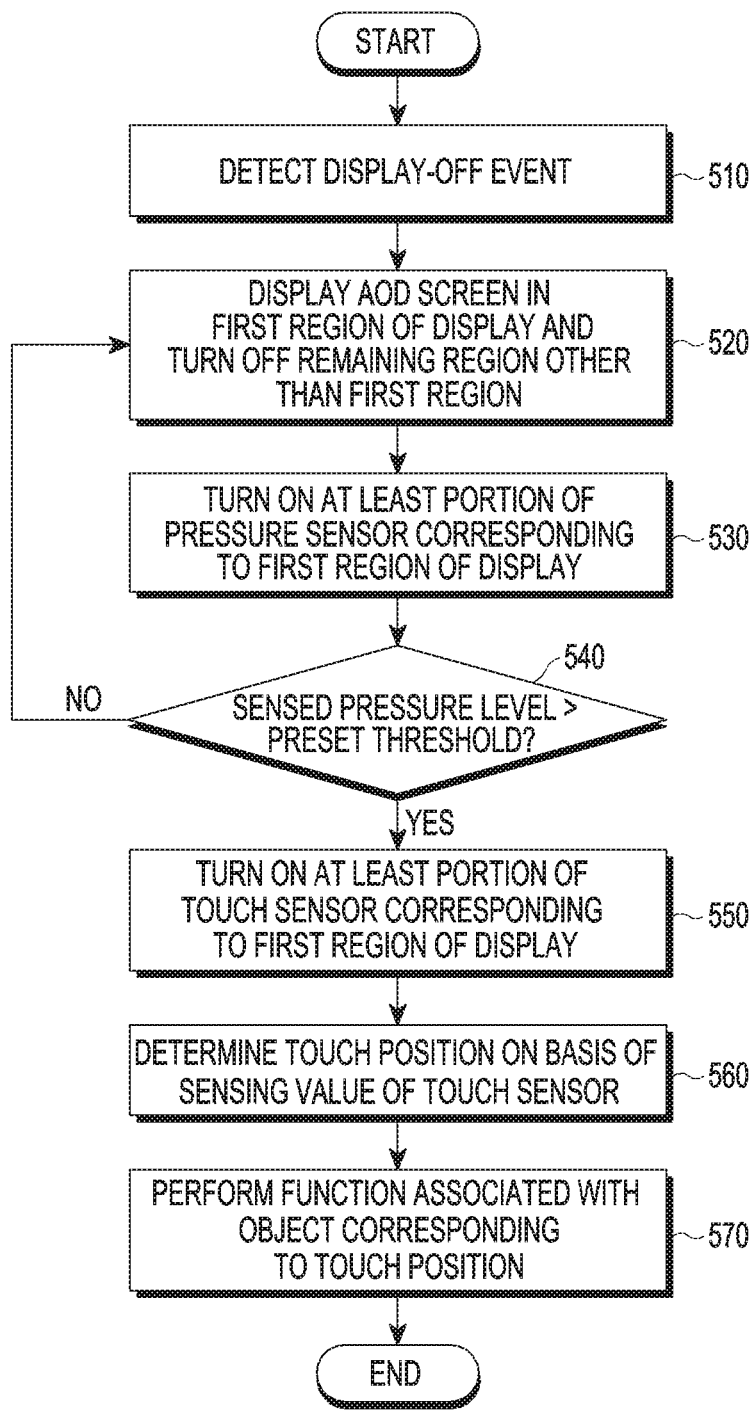
FIG. 5B is a flowchart illustrating a method for controlling an electronic device according to various embodiments of the present disclosure.
Figure 6A:
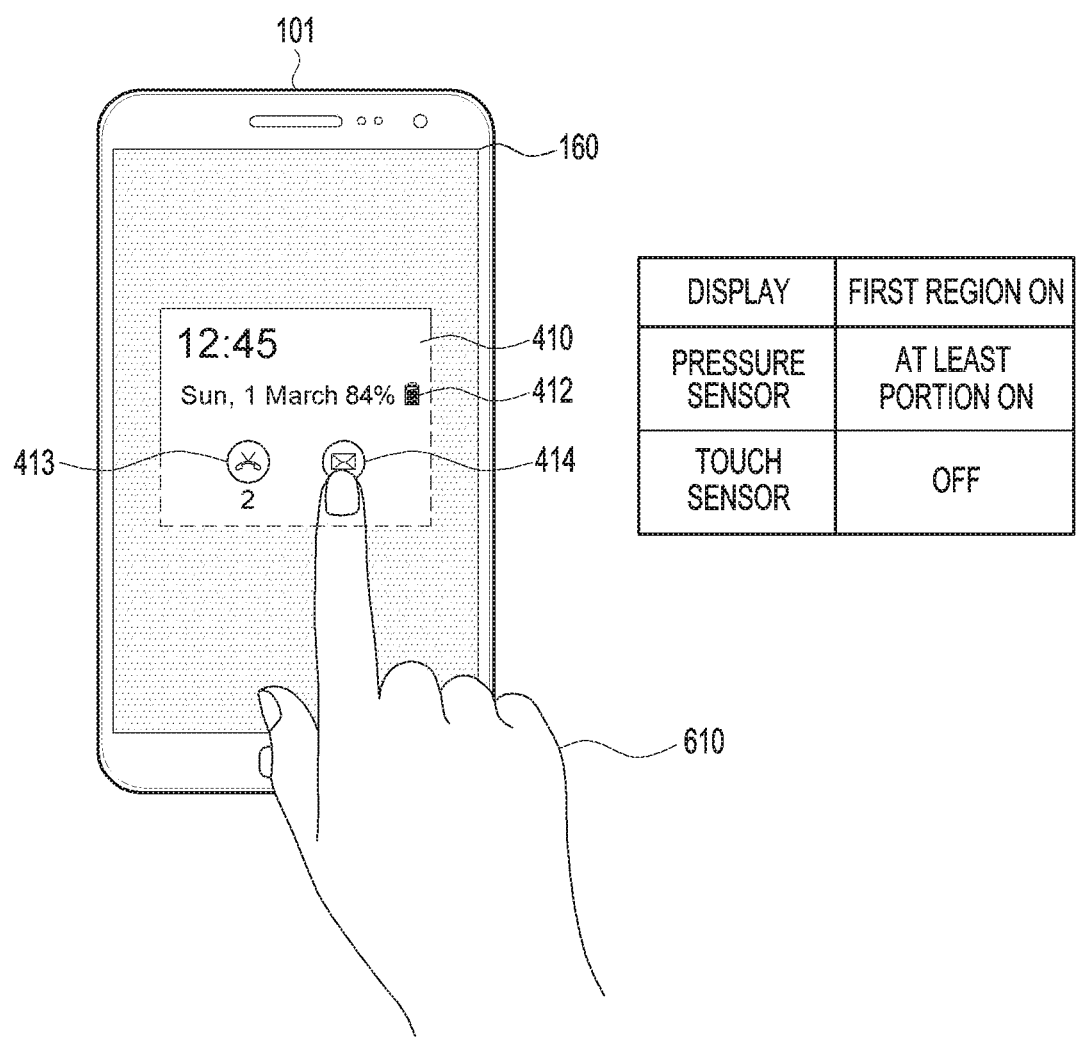
FIGS. 6A to 6C are conceptual diagrams illustrating an electronic device according to various embodiments of the present disclosure.
Figure 6B:
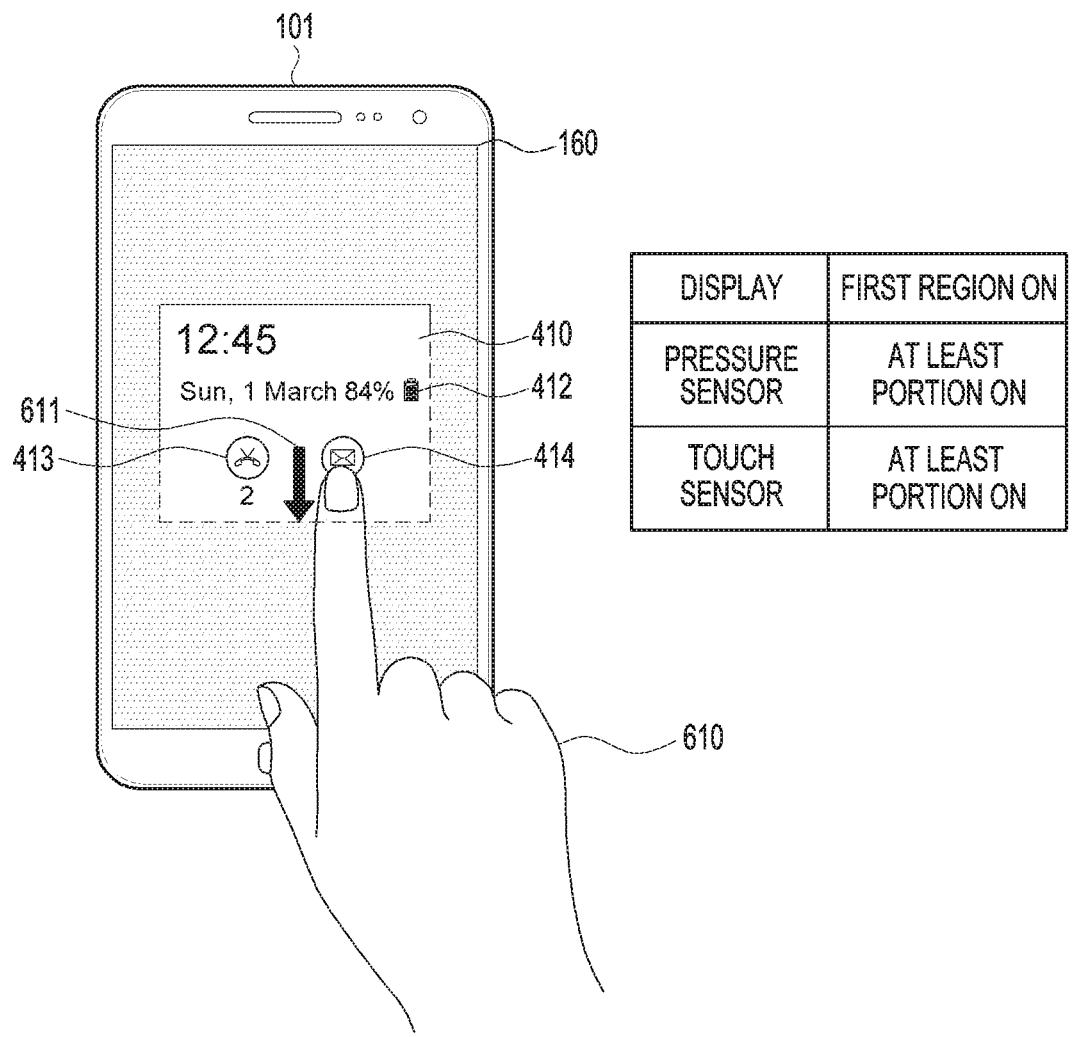
Figure 6C:
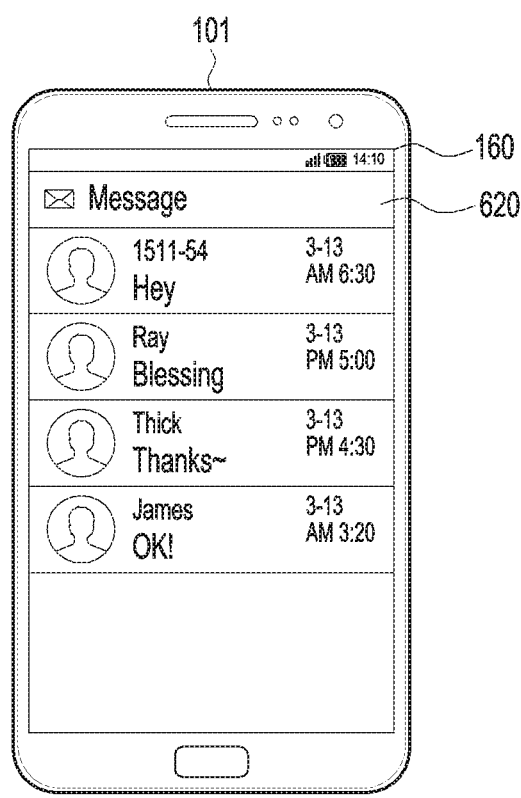

FIG. 5B is a flowchart illustrating a method for controlling an electronic device according to various embodiments of the present disclosure. The embodiment of FIG. 5B will be described in detail with reference to FIGS. 6A to 6C. FIGS. 6A to 6C are conceptual diagrams illustrating the electronic device according to various embodiments of the present disclosure.

In operation 510, the electronic device 101 may detect a display-off event. The display-off event may be, for example, the push of a turn-on/off hardware switch disposed on the electronic device 101 or the expiration of a preset screen save setting time, but may not limited thereto. For example, a user may push the turn-on/off hardware switch disposed on the electronic device 101 while the display 160 is turned on, and the electronic device 101 may detect the push of the turn-on/off hardware switch as a display-off event and may control at least a portion of the display to turn off in response. Here, controlling at least a portion of the display to turn off may mean that the electronic device 101 operates not to provide power to a light source corresponding to at least the portion of the display.

In operation 520, the electronic device 101 may display an AOD screen displayed in a first region of the display 160 and may turn off the remaining region other than the first region. That is, the electronic device 101 may provide power to a light source corresponding to the first region of the display 160. Accordingly, as illustrated in FIG. 6A, the electronic device 101 may control the first region 410 to turn on and may control the remaining region other than the first region 410 to turn off. Alternatively, as illustrated in FIG. 4B, the electronic device 101 may determine the first region to be a region of various objects 421 to 424.

In operation 530, the electronic device 101 may turn on at least a portion of a pressure sensor corresponding to the first region of the display. In various embodiments of the present disclosure, the electronic device 101 may include a pressure sensor capable of sensing pressure applied to the display 160. The pressure sensor may be configured with a touch sensor (for example, a touch panel) in a single body or may be configured as hardware separate from a touch sensor (for example, a touch panel). It will be easily understood by those skilled in the art that the type and the position of a disposed pressure sensor are not limited as long as the sensor is capable of sensing the pressure level applied to one point of the display 160. The electronic device 101 may turn on at least the portion of the pressure sensor to sense the level of pressure applied to the first region 410 of the display 160. Alternatively, the electronic device 101 may turn on at least the portion of the pressure sensor to sense the level of pressure applied to objects 411 to 414 in the first region 410 of the display 160. Accordingly, as illustrated in FIG. 6A, the pressure sensor of the electronic device 101 may sense the pressure level that the user 610 applies to the display. The electronic device 101 may include a touch sensor (for example, a touch panel) that senses the position of contact between the display and the user (or a stylus pen). The electronic device 101 may control the entire region of the touch sensor to turn off.

In operation 540, the electronic device 101 may determine whether the sensed pressure level exceeds a preset threshold. The preset threshold may be a value set in advance to determine whether the user intentionally presses a particular point with significant pressure. The electronic device 101 may store the preset threshold at a value set in advance and may update the preset threshold on the basis of the pressure level to be sensed later. For example, as illustrated in FIG. 6B, the electronic device 101 may determine that the level of pressure applied from a touch 611, which is made by the user intentionally pressing, exceeds the preset threshold. Accordingly, the electronic device 101 may control at least a portion of the touch sensor to turn on.

In operation 550, the electronic device 101 may turn on at least a portion of the touch sensor corresponding to the first region of the display 160. For example, the electronic device 101 may apply power for detecting a scan line corresponding to the first region in the touch sensor (for example, a touch panel) and may detect a capacitance change. Alternatively, the electronic device 101 may detect the level of induced electromotive force per loop channel with respect to the touch of an electromagnetic resonance (EMR) stylus pen. Alternatively, the electronic device 101 may detect the level of voltage or current output per electrode channel with respect to the touch of an electrically coupled resonance (ECR) stylus pen.

In operation 560, the electronic device 101 may determine a touch position on the basis of the sensing value of the touch sensor. For example, the electronic device 101 may determine a touch position on the basis of the changing capacitance value (or the changing value of current, voltage, impedance, or power corresponding to a capacitance change) of a C-type touch panel or the level of induced electromotive force of an EMR loop channel. In operation 570, the electronic device 101 may perform a function associated with an object corresponding to the touch position. In one embodiment, as in operation 505 of FIG. 5A, the electronic device 101 may display a screen associated with the object in at least a portion of the display 160. For example, as illustrated in FIG. 6B, the electronic device 101 may determine that the position of the touch 611 corresponds to a position at which an indicator 414 indicating a received text is displayed. As illustrated in FIG. 6C, the electronic device 101 may display an execution screen 620 of a text application corresponding to the indicator 414 indicating the received text. The execution screen 620 of the text application may be displayed in the entire region of the display 160 or in a substantially full region excluding an indicator bar. Accordingly, the electronic device 101 may immediately provide a function corresponding to an object included in the AOD screen. In particular, the electronic device 101 may not provide power for sensing to the touch sensor before a pressure exceeding the threshold is detected, thereby maintaining low power consumption. In another embodiment, the function associated with the object may be implemented in various ways, such as light emission, sound output, and signal transmission, in addition to screen display, and it will be easily understood by those skilled in the art that the function associated with the object is not limited as long as the electronic device 101 can perform the function.

Figure 7:
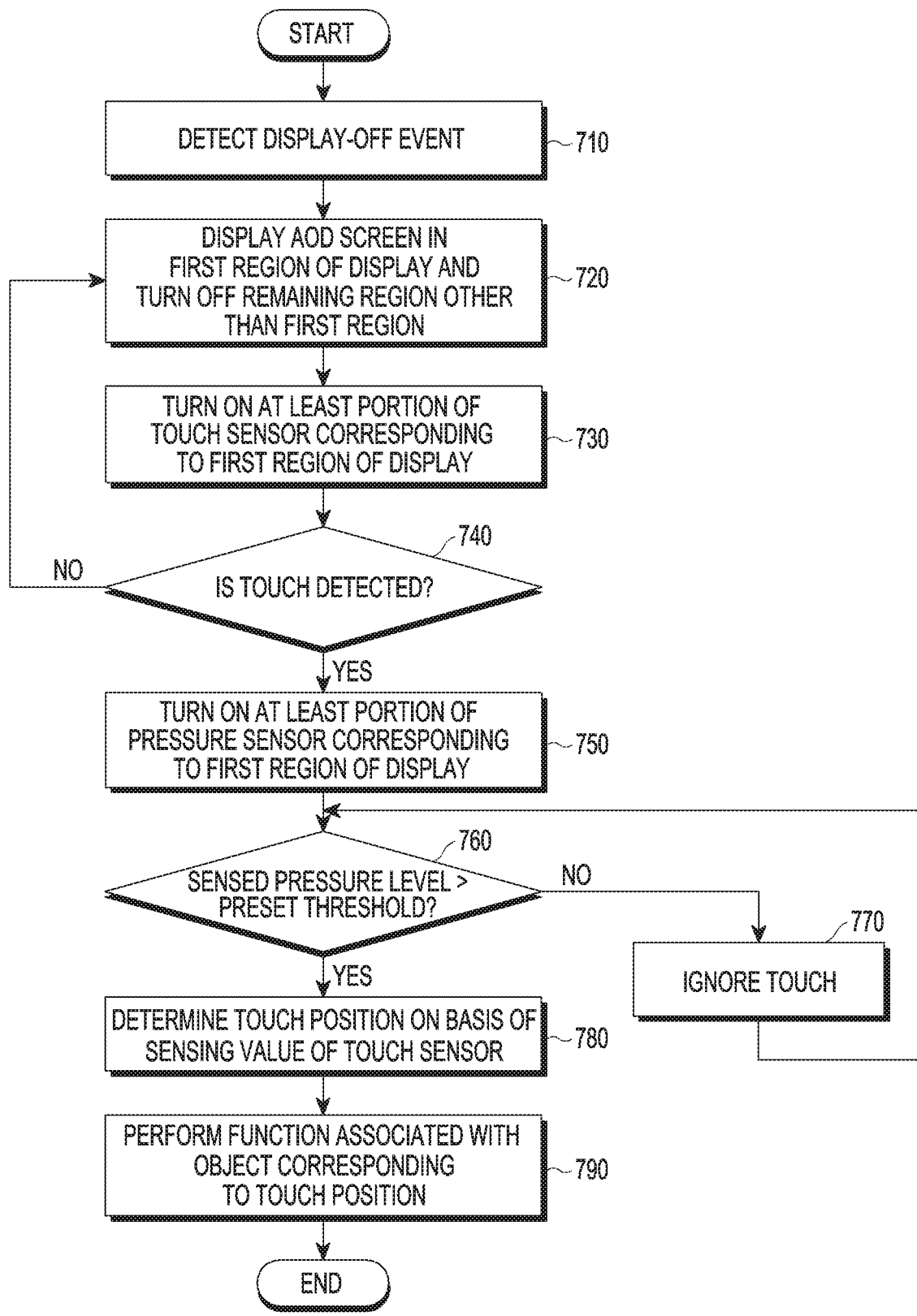
FIG. 7 is a flowchart illustrating a method for controlling an electronic device according to another embodiment of the present disclosure.
Figure 8A:
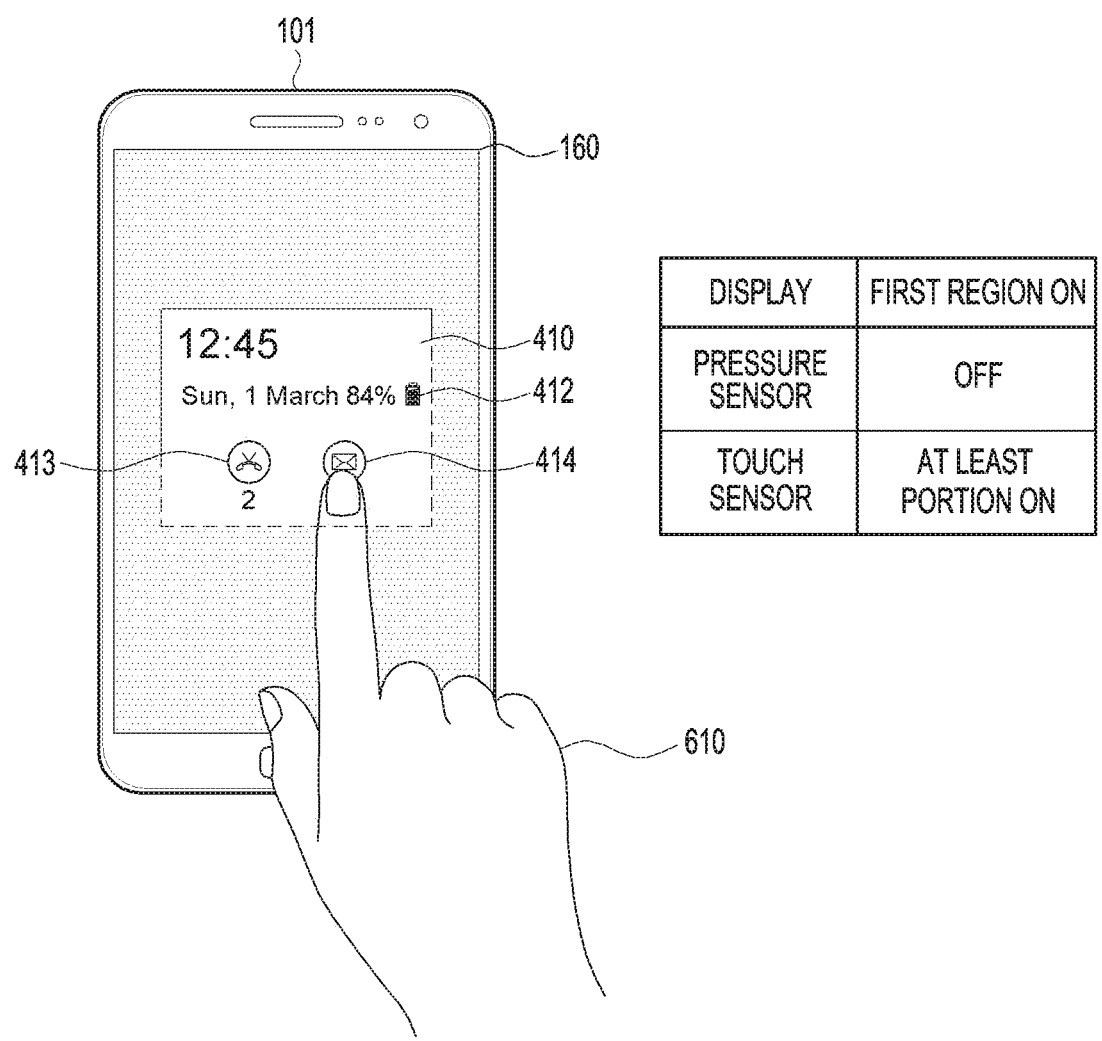
FIGS. 8A and 8B are conceptual diagrams illustrating an electronic device according to various embodiments of the present disclosure.
Figure 8B:
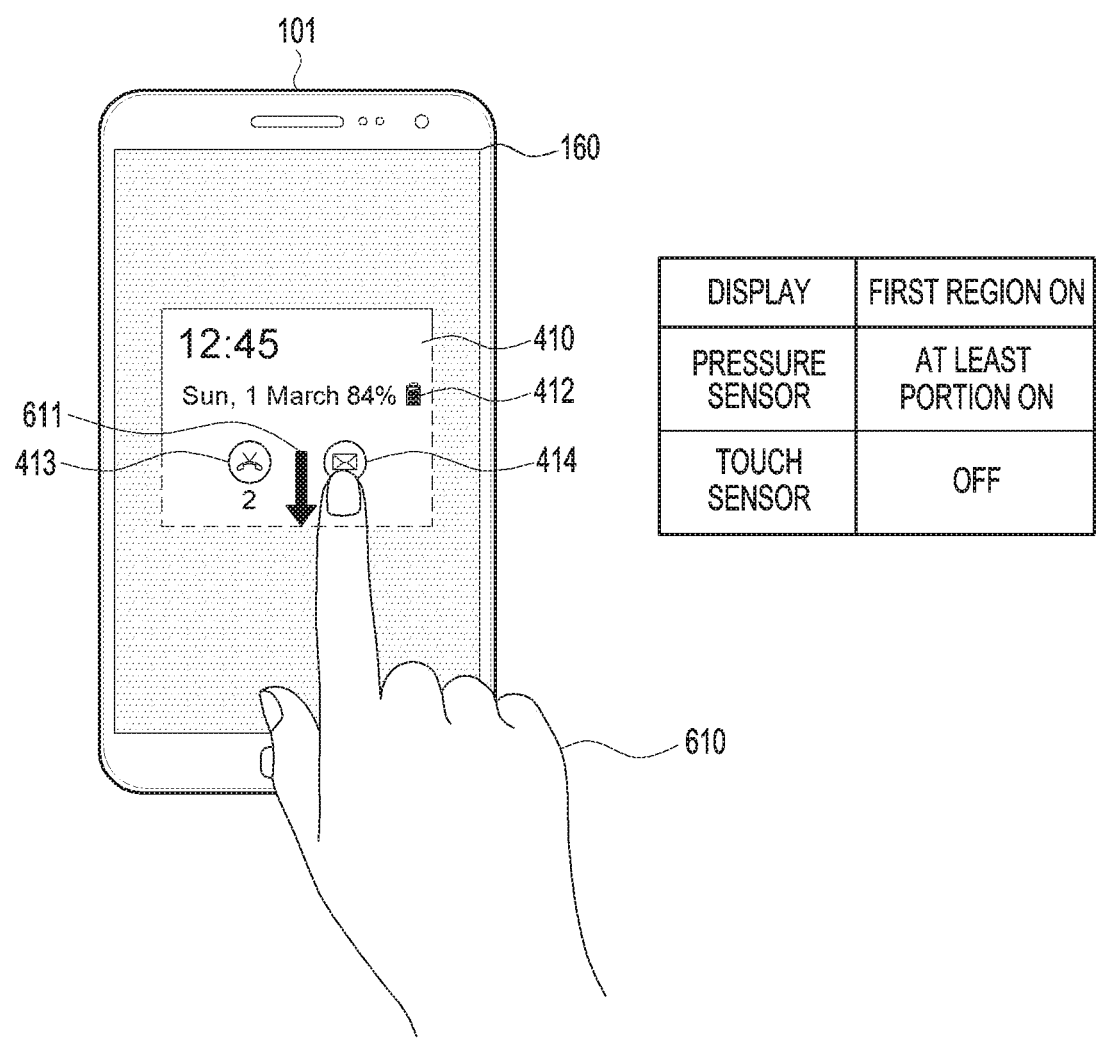

FIG. 7 is a flowchart illustrating a method for controlling an electronic device according to another embodiment of the present disclosure. The embodiment of FIG. 7 will be described in detail with reference to FIGS. 8A and 8B. FIGS. 8A and 8B are conceptual diagrams illustrating the electronic device according to various embodiments of the present disclosure.

In operation 710, the electronic device 101 may detect a display-off event. In operation 720, the electronic device 101 may display an AOD screen in a first region of a display and may control the remaining region other than the first region to turn off. In operation 730, the electronic device 101 may turn on at least a portion of a touch sensor corresponding to the first region of the display. Referring to FIG. 8A, the electronic device 101 may turn on at least a portion of the touch sensor so as to sense the pressure level applied to the first region 410 of the display 160. Specifically, the electronic device 101 may apply power for detection to a scan line of the touch sensor in order to detect a capacitance change in the first region 410 of the display 160. Alternatively, the electronic device 101 may scan a loop of the touch sensor to detect induced electromotive force from a loop of the first region 410 of the display 160. In the present embodiment, the electronic device 101 may control the entire region of a pressure sensor to turn off.

In operation 740, the electronic device 101 may determine whether a touch is detected. The electronic device 101 may determine whether the touch is detected on the basis of the sensing value of the touch sensor. In operation 750, the electronic device 101 may turn on at least a portion of the pressure sensor corresponding to the first region of the display 160. For example, as illustrated in FIG. 8B, the electronic device 101 may turn on at least a portion of the pressure sensor so as to sense the pressure level applied to the first region 410 of the display 160. Alternatively, the electronic device 101 may turn on at least a portion of the pressure sensor so as to sense the pressure level at a point where the touch is detected.

In operation 760, the electronic device 101 may determine whether the sensed pressure level exceeds a preset threshold. In the embodiment of FIG. 7, the preset threshold may also be a value set in advance to determine whether the user intentionally presses a particular point with substantial pressure. When the pressure level is within the threshold or less, the electronic device 101 may ignore the touch in operation 770. Accordingly, a malfunction due to a user's unintended touch on the display can be prevented. When the pressure level exceeds the threshold, the electronic device 101 may determine a touch position on the basis of the sensing value of the touch sensor in operation 780. In operation 790, the electronic device 101 may perform a function associated with an object corresponding to the touch position and may display, for example, an execution screen of an associated application as illustrated in FIG. 6C. Accordingly, the electronic device 101 may immediately provide a function corresponding to an object included in the AOD screen. In particular, the electronic device 101 may keep turning on only a portion of the touch sensor corresponding to the AOD screen or at least one object on the AOD screen, thereby maintaining low power consumption.

Figure 9:
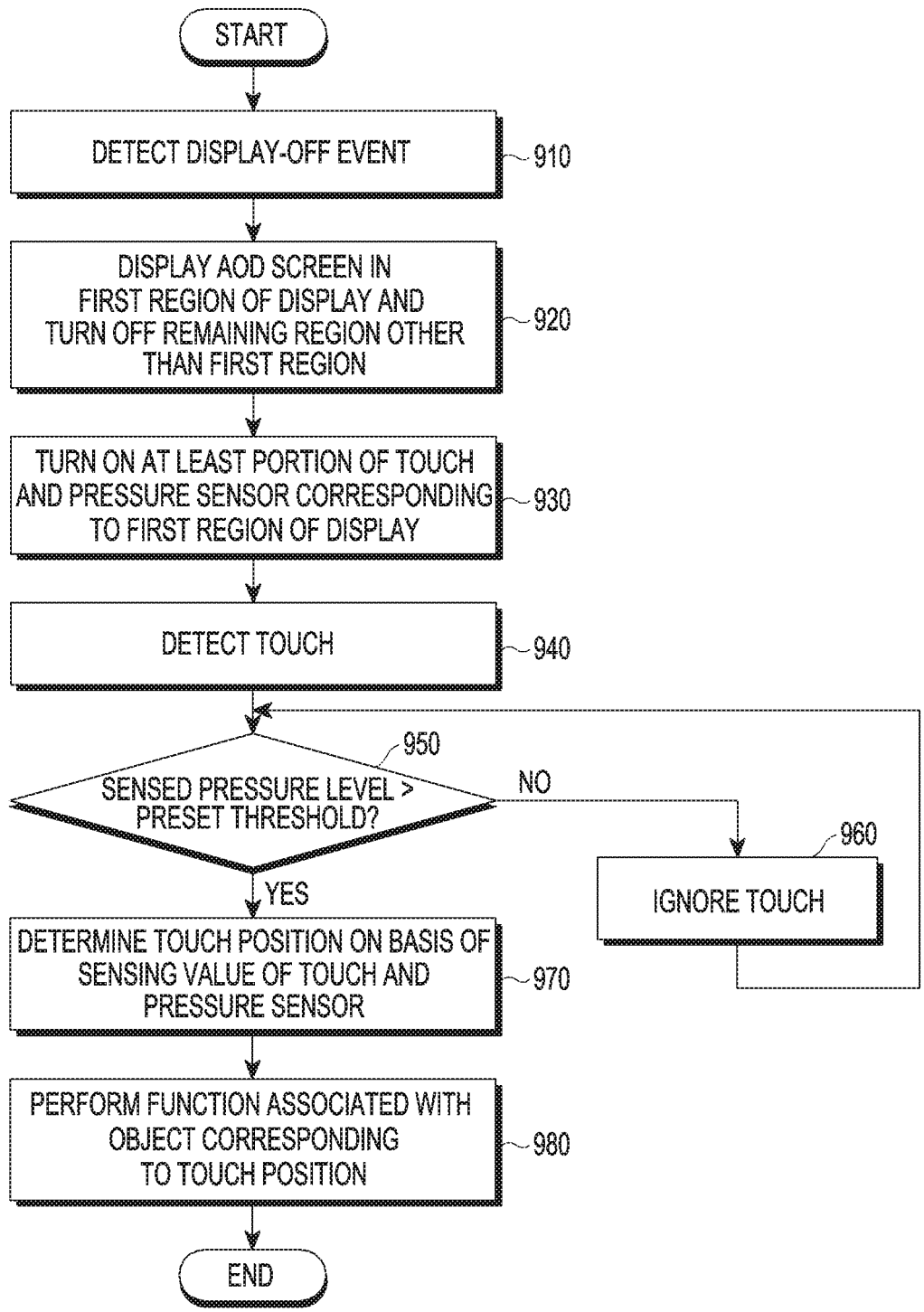
FIG. 9 is a flowchart illustrating a method for controlling an electronic device according to various embodiments of the present disclosure.

FIG. 9 is a flowchart illustrating a method for controlling an electronic device according to various embodiments of the present disclosure.

In operation 910, the electronic device 101 may detect a display-off event. In operation 920, the electronic device 101 may display an AOD screen in a first region of a display and may control the remaining region other than the first region to turn off. In operation 930, the electronic device 101 may turn on at least a portion of a touch and pressure sensor corresponding to the first region of the display. That is, the electronic device 101 illustrated in FIG. 9 may include a touch and pressure sensor capable of sensing touch and pressure together. For example, the electronic device 101 may include capacitive glass. The capacitive glass may be disposed on the display 160 and may be made of a transparent material. The capacitive glass may be touched by a user, and the shape of a touch point and a neighboring area thereof may be changed by the pressure of a touch. As the shape of the capacitive glass is changed, the capacitance of the point may also be changed. The electronic device 101 may determine a touch position and the pressure level of the touch on the basis of the capacitance change in the capacitive glass.

Alternatively, the electronic device 101 may include an EMR loop channel. In this case, the electronic device 101 may scan a loop channel corresponding to the first region of the display. In an EMR system, a stylus pen may include a capacitor that changes capacitance depending on pen pressure. That is, the capacitance of the capacitor included in the EMR stylus pen may change depending on pressure between the stylus pen and the electronic device 101, and thus a generated resonance frequency may be changed accordingly. The electronic device 101 may determine the pressure level between the stylus pen and the electronic device 101 on the basis of a change in the resonance frequency of a signal from the stylus pen. Further, the signal from the stylus pen may generate induced electromotive force in the loop channel of the electronic device 101, and the electronic device 101 may determine the input position of the stylus pen on the basis of the strength of the induced electromotive force per loop channel.

Alternatively, the electronic device 101 may include an ECR electrode channel. In this case, the electronic device 101 may scan an electrode channel corresponding to the first region of the display. In an ECR system, a stylus pen may include a capacitor that changes capacitance depending on pen pressure. That is, the capacitance of the capacitor included in the ECR stylus pen may change depending on pressure between the stylus pen and the electronic device 101, and thus a generated resonance frequency may be changed accordingly. The electronic device 101 may determine the pressure level between the stylus pen and the electronic device 101 on the basis of a change in the resonance frequency of a signal from the stylus pen. Further, the signal from the stylus pen may generate induced electromotive force in the electrode channel of the electronic device 101, and the electronic device 101 may determine the input position of the stylus pen on the basis of the strength of induced electromotive force per electrode channel.

Alternatively, the electronic device 101 may include a resistance (R)-type touch panel. The R-type touch panel is a touch panel that is capable of determining a touch position on the basis of a change in resistance value from a touch, and the electronic device 101 can determine a touch position on the basis of an output signal from the R-type touch panel. In addition, the degree of the change in resistance value may be increased or decreased by the pressure of a touch, and the electronic device 101 may determine the level of touch pressure on the basis of a change in resistance value.

As described above, the electronic device 101 may include various types of hardware to simultaneously determine the position and the pressure level of a touch.

In operation 940, the electronic device 101 may detect a touch. In operation 950, the electronic device 101 may determine whether the sensed pressure level of the touch exceeds a preset threshold. When it is determined that the sensed pressure level matches the preset threshold or less, the electronic device 101 may ignore the touch in operation 960. When it is determined that the sensed pressure level exceeds the preset threshold, the electronic device 101 may determine the position of the touch on the basis of the sensing value of the touch and pressure sensor in operation 970. In operation 980, the electronic device 101 may perform a function associated with an object corresponding to the position of the touch.

As described above, the present disclosure may include both an embodiment in which a touch sensor and a pressure sensor are separated and an embodiment in which a touch sensor and a pressure sensor are configured as a single sensor.

Figure 10:
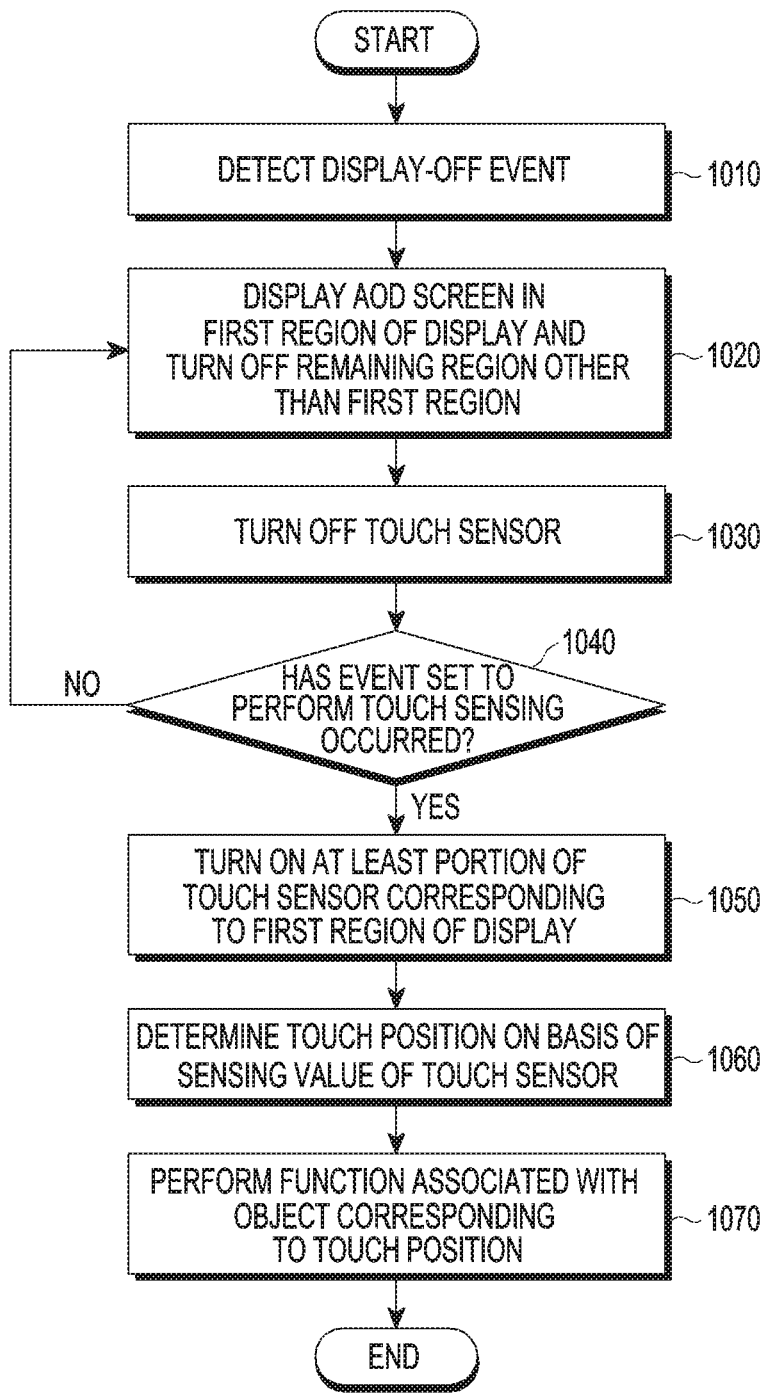
FIG. 10 is a flowchart illustrating a method for controlling an electronic device according to various embodiments of the present disclosure.
Figure 11A:
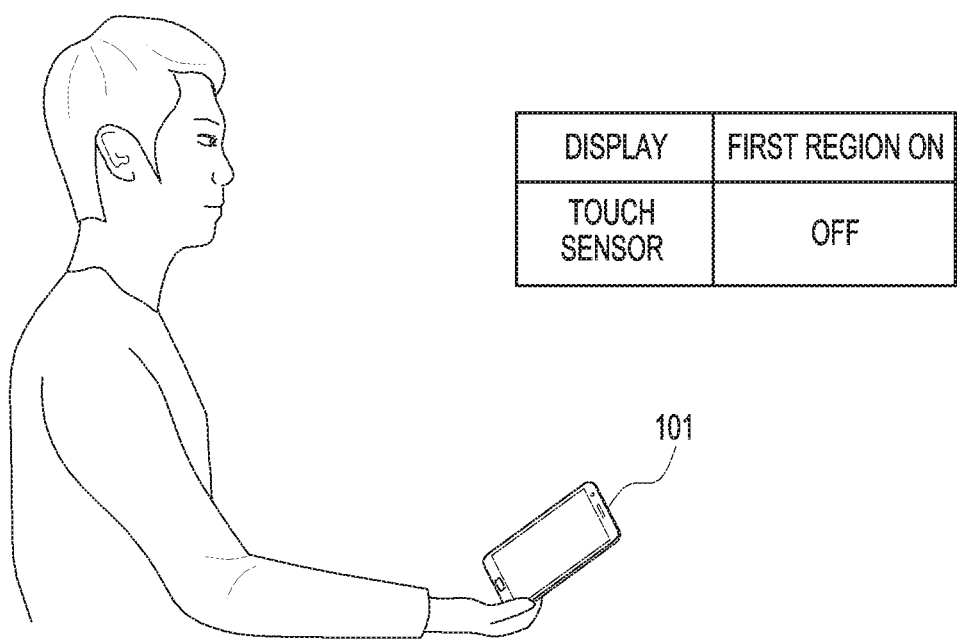
FIGS. 11A and 11B are conceptual diagrams illustrating the operation of an electronic device according to various embodiments of the present disclosure.
Figure 11B:
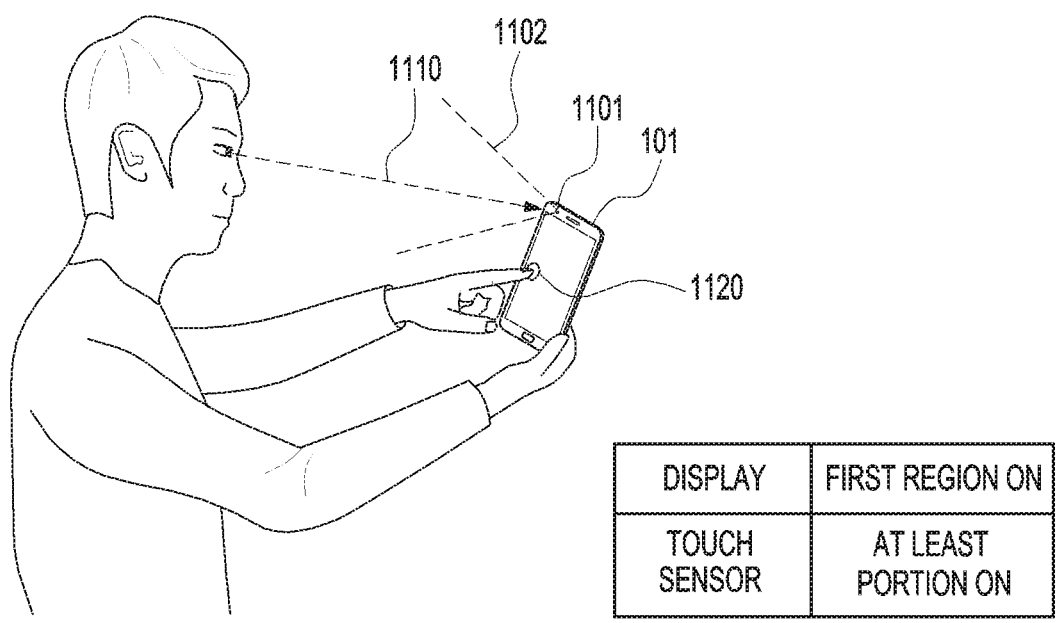

FIG. 10 is a flowchart illustrating a method for controlling an electronic device according to various embodiments of the present disclosure. The embodiment of FIG. 10 will be described in detail with reference to FIGS. 11A and 11B. FIGS. 11A and 11B are conceptual diagrams illustrating the operation of the electronic device according to various embodiments of the present disclosure.

In operation 1010, the electronic device 101 may detect a display-off event. In operation 1020, the electronic device 101 may display an AOD screen in a first region of a display and may control the remaining region other than the first region to turn off.

In operation 1030, the electronic device 101 may control the entire region of a touch sensor to turn off. In operation 1040, the electronic device 101 may determine whether an event set to perform touch sensing has occurred. For example, the event set to perform touch sensing may be an event in which a pressure level sensed by a pressure sensor exceeds a preset threshold as in FIG. 5B. As described above with reference to FIG. 5B, the electronic device 101 may monitor the pressure level sensed by the pressure sensor and may detect a case where the pressure level exceeds the preset threshold as the event set to perform touch sensing.

In various embodiments of the present disclosure, various events may be set to perform touch sensing. In addition to the case where the sensed pressure level exceeds the threshold, there is no limitation on the kind of event as long as the electronic device 101 can sense the event. FIGS. 11A and 11B are conceptual diagrams illustrating an event set to perform touch sensing according to various embodiments of the present disclosure.

In the embodiment of FIGS. 11A and 11B, the event set to perform touch sensing may be an event in which a user looks at the display 160 of the electronic device 101.

Referring to FIG. 11A, the user may hold the electronic device 101 and may touch the display 160. The electronic device 101 may not detect that the user looks at the display 160 and thus may determine that the event set to perform touch sensing has not occurred. Accordingly, the electronic device 101 may maintain the entire region of the touch sensor to stay turned off, and the user's touch may not be sensed by the electronic device 101.

Referring to FIG. 11B, the user may look 1110 at the electronic device 101. The electronic device 101 may include a camera 1101 to take a picture facing forward and may acquire an image obtained by photographing 1102 a view while the electronic device 101 faces forward. The electronic device 101 may analyze the acquired image to determine the user's gaze. For example, the electronic device 101 may determine the user's gaze on the basis of the shape of an eye region of the person included in the image, but there is no limitation on a method in which the electronic device 101 determines the user's gaze. The electronic device 101 may determine that the user's gaze is directed to the display 160 or to a specific object of the AOD screen on the display 160 and accordingly may determine that the event set to perform touch sensing has occurred.

When it is determined that the event set to perform touch sensing has occurred, the electronic device 101 may turn on at least a portion of the touch sensor corresponding to the first region of the display 160 in operation 1050. In operation 1060, the electronic device 101 may determine a touch position on the basis of the sensing value of the touch sensor. In operation 1070, the electronic device 101 may perform a function associated with an object corresponding to the touch position. For example, as illustrated in FIG. 11B, the electronic device 101 may determine the position of a touch 1120 on the display 160 and may perform a function associated with an object corresponding to the position of the touch 1120.

As described above, when an event set to perform touch sensing occurs, the electronic device 101 may control at least a portion of a touch sensor to turn on and may process a touch, thus immediately providing a function associated with an object on an AOD screen. Particularly, the electronic device 101 may control the touch sensor to turn off before an event set to perform touch sensing is detected, thereby reducing power consumption and preventing the user's unintended touch from being processed.

The configuration associated with the pressure level illustrated in operations 750 and 760 in the embodiment of FIG. 7 may also be modified to be implemented as an event set to perform various types of touch sensing. For example, when a touch is detected in operation 740, the electronic device 101 may turn on the camera to take a picture while facing forward and may acquire an image taken facing forward in operation 750. In operation 760, the electronic device 101 may analyze the acquired image to determine whether the user is looking at the display 160. When it not is determined that the user is looking at the display 160, the electronic device 101 may ignore the touch in operation 770. When it is determined that the user is looking at the display 160, the electronic device 101 may determine a touch position on the basis of the sensing value of the touch sensor in operation 780. That is, in a method for controlling an electronic device, according to another embodiment of the present disclosure, operation 750 may be replaced with an operation of turning on hardware for detecting an event set to perform touch sensing. Furthermore, in the method for controlling the electronic device, according to the other embodiment of the present disclosure, operation 760 may be replaced with an operation of determining whether an event set to perform touch sensing is detected.

Figure 12:
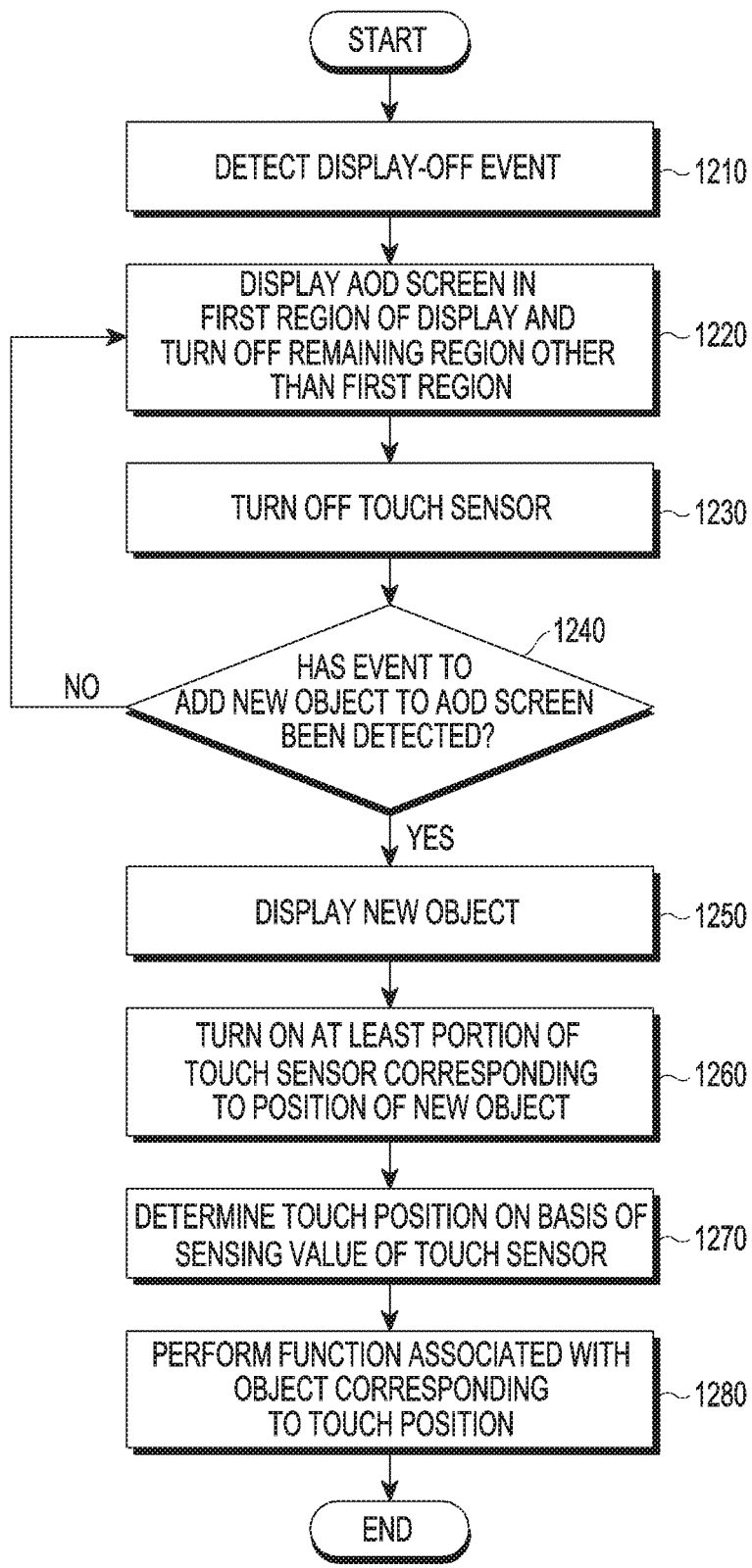
FIG. 12 is a flowchart illustrating a method for controlling an electronic device according to various embodiments of the present disclosure.
Figure 13A:
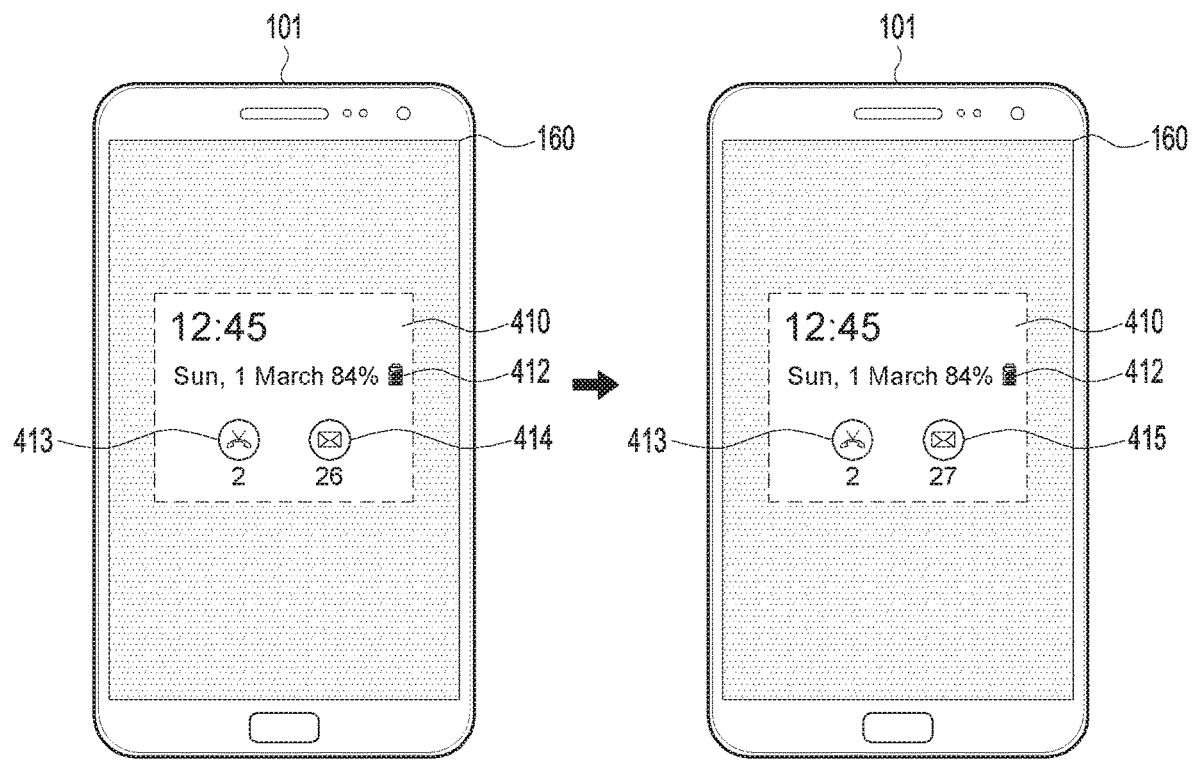
FIGS. 13A and 13B are conceptual diagrams illustrating an electronic device according to various embodiments of the present disclosure.
Figure 13B:
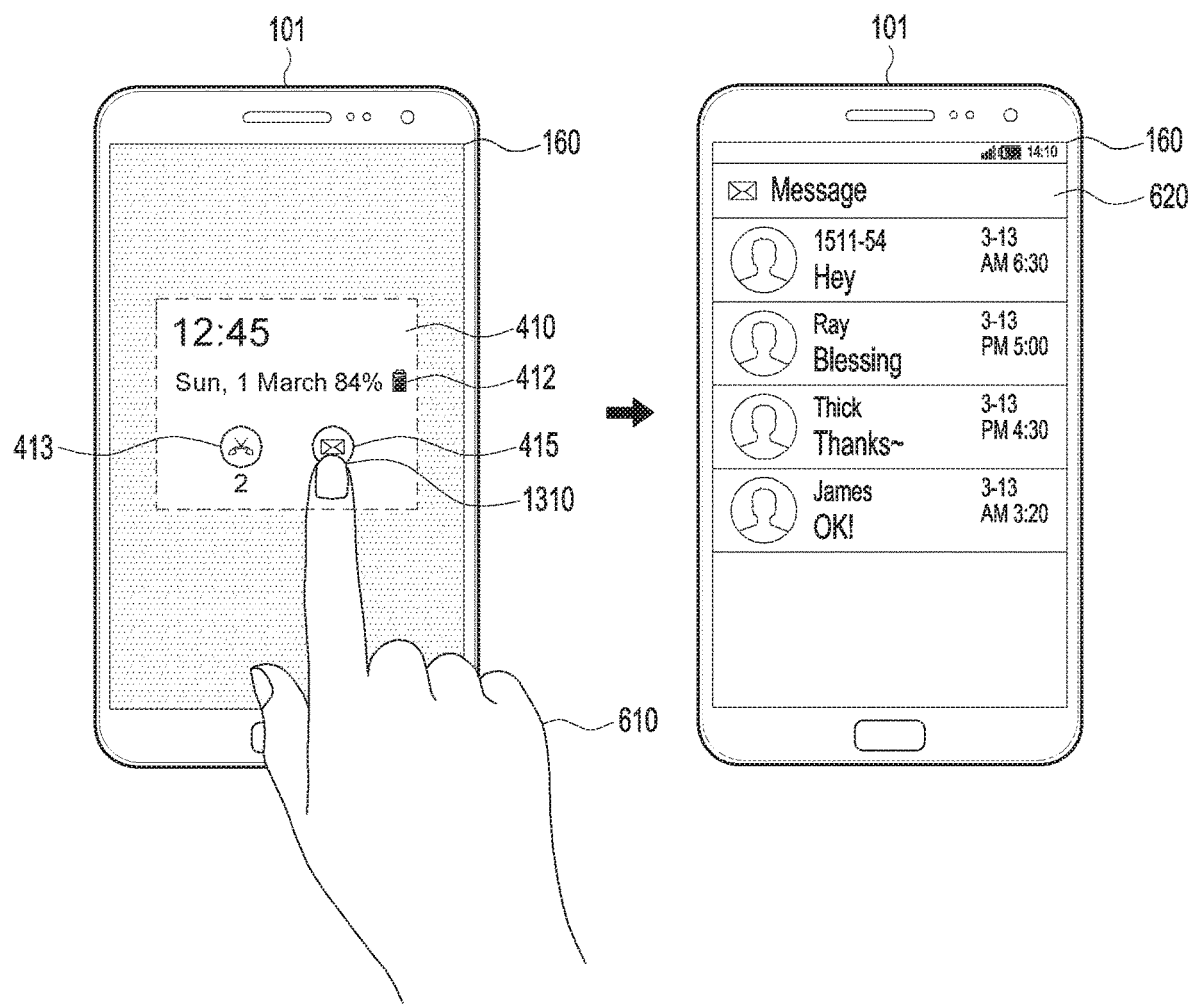

FIG. 12 is a flowchart illustrating a method for controlling an electronic device according to various embodiments of the present disclosure. The embodiment of FIG. 12 will be described in detail with reference to FIGS. 13A and 13B. FIGS. 13A and 13B are conceptual diagrams illustrating the electronic device according to various embodiments of the present disclosure.

Referring to FIG. 12, in operation 1210, the electronic device 101 may detect a display-off event. In operation 1220, the electronic device 101 displays an AOD screen in a first region of a display 160 and may control the remaining region other than the first region to turn off. In operation 1230, the electronic device 101 may turn off the entire region of a touch sensor.

In operation 1240, the electronic device 101 may determine whether an event to add a new object to the AOD screen is detected. That is, in the embodiment of FIG. 12, adding a new object to an AOD screen may be an event set to perform touch sensing. When the event to add the new object is detected, the electronic device 101 may display the new object in operation 1250. For example, as illustrated in FIG. 13A, when receipt of a new text is detected as an event, the electronic device 101 may display the new object 415 on the AOD screen.

In operation 1260, the electronic device 101 may turn on at least a portion of the touch sensor corresponding to the position of the new object. For example, in FIG. 13A, the electronic device 101 may control at least a portion of the touch sensor, including the new object 415, to turn on.

In operation 1270, the electronic device 101 may determine a touch position on the basis of the sensing value of the touch sensor. In operation 1280, the electronic device 101 may perform a function associated with an object corresponding to the touch position. When the electronic device 101 controls only the portion of the touch sensor corresponding to the new object 415 to turn on, the electronic device 101 may immediately perform a function associated with the new object 415 in response to the detecting the touch. For example, as illustrated in FIG. 13B, the electronic device 101 may execute a text management application associated with the new object 415 and may display an execution screen 620.

Figure 14:
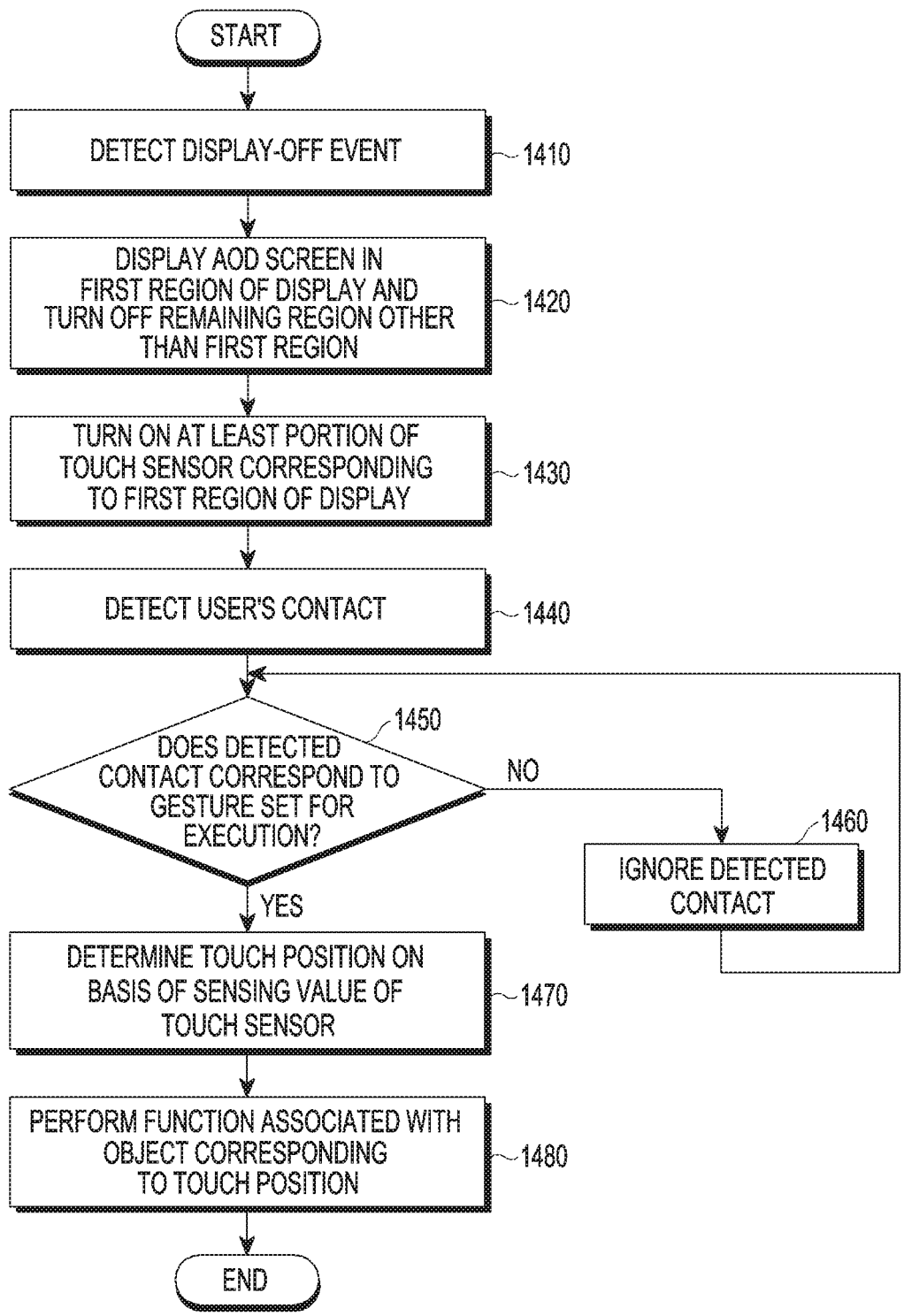
FIG. 14 is a flowchart illustrating a method for controlling an electronic device according to various embodiments of the present disclosure.

FIG. 14 is a flowchart illustrating a method for controlling an electronic device according to various embodiments of the present disclosure. The embodiment of FIG. 14 illustrates a control method for providing a function associated with an object on an AOD screen using a touch sensor alone. The embodiment of FIG. 14 will be described in detail with reference to FIGS. 15A and 15B.

In operation 1410, the electronic device 101 may detect a display-off event. In operation 1420, the electronic device 101 may display an AOD screen in a first region of a display and may control the remaining region other than the first region to turn off. In operation 1430, the electronic device 101 may turn on at least a portion of a touch sensor corresponding to the first region of the display. For example, the electronic device 101 may turn on the portion of the touch sensor corresponding to the first region or may turn on a portion of the touch sensor corresponding to the position of an object position in the first region.

In operation 1440, the electronic device 101 may detect a user's contact. In operation 1450, the electronic device 101 may determine whether the detected contact corresponds to a gesture set for execution. When it is determined that the detected contact does not correspond to the set gesture, the electronic device 101 may ignore the detected contact in operation 1460. When it is determined that the detected contact corresponds to the set gesture, the electronic device 101 may determine the position of the contact on the basis of the sensing value of the touch sensor in operation 1470. In operation 1480, the electronic device 101 may perform a function associated with an object corresponding to the position of the contact.

Figure 15A:
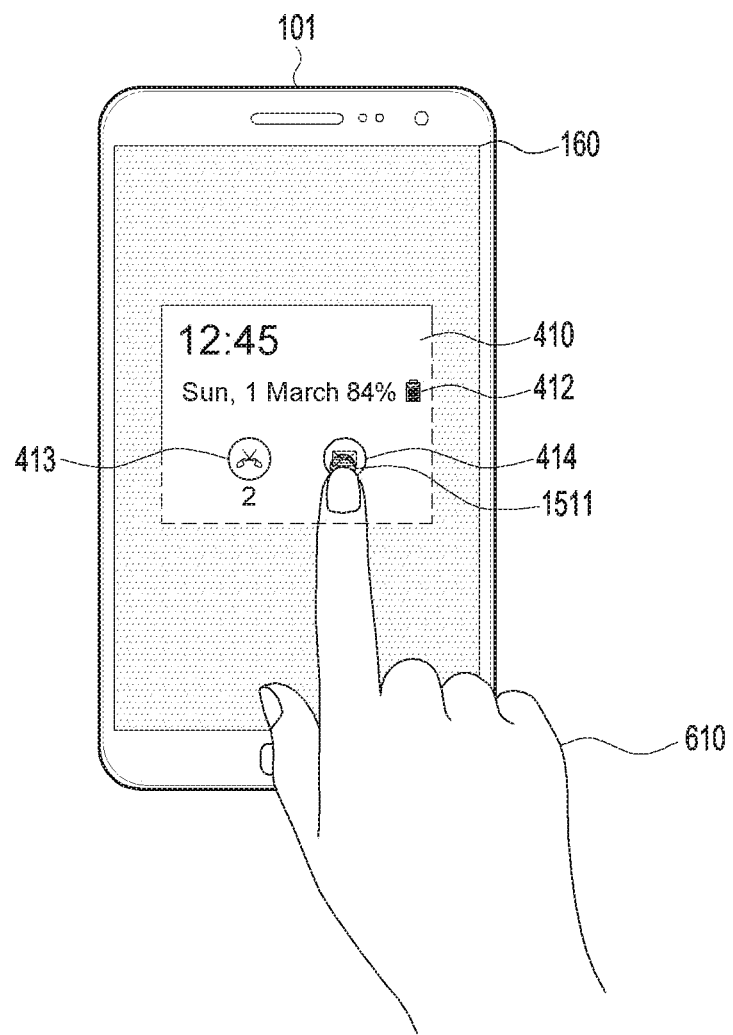
FIGS. 15A and 15B are conceptual diagrams illustrating an electronic device according to various embodiments of the present disclosure.
Figure 15B:
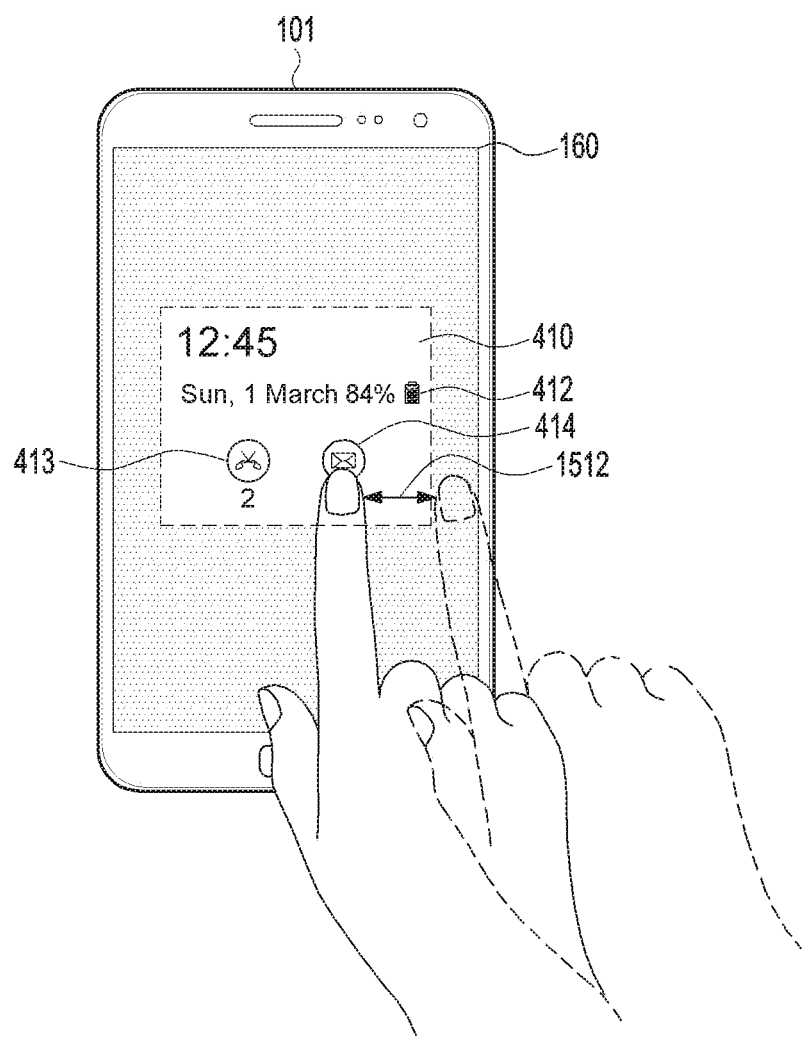

For example, in an embodiment of FIG. 15A, the set gesture for execution may be a long press. The electronic device 101 may determine that a touch 1511 that is made for longer than a threshold time is a long press and may thus perform a function associated with an indicator 414 indicating a received text corresponding to the touch 1511. On the other hand, the electronic device 101 may ignore a touch that is made for the threshold time or shorter. Further, in an embodiment of FIG. 15B, the set gesture for execution may be rubbing. The electronic device 101 may determine that a continuous side-to-side touch 1512 is a rubbing gesture and may thus perform a function associated with an indicator 414 indicating a received text corresponding to the touch 1512. On the other hand, the electronic device 101 may ignore a general touch to the indicator 414.

According to various embodiments of the present disclosure, a method for controlling an electronic device may include: displaying an AOD screen in a first region of a display; controlling the remaining region of the display, other than the first region, to turn off; controlling the entire region of the display to turn on when a touch in the first region is sensed; and displaying a screen associated with an object corresponding to the position of the touch in at least a portion of the display.

According to various embodiments of the present disclosure, the method for controlling the electronic device may further include: controlling a touch sensor of the electronic device to turn off while the AOD screen is displayed; and controlling at least a portion of the touch sensor of the electronic device to turn on to sense the touch when an event set for the touch sensor to perform touch sensing is detected.

According to various embodiments of the present disclosure, the controlling of at least the portion of the touch sensor to turn on to sense the touch when an event set for the touch sensor to perform touch sensing is detected may include: sensing the pressure level of the touch; and controlling at least the portion of the touch sensor to turn on by detecting a case where the pressure level of the touch exceeds a preset threshold as the event set to perform touch sensing.

According to various embodiments of the present disclosure, the controlling of at least the portion of the touch sensor to turn on to sense the touch when an event set for the touch sensor to perform touch sensing is detected may include: capturing an image by photographing a view with the electronic device facing forward; and controlling at least the portion of the touch sensor to turn on by detecting a case where a user looks at the display as the event set to perform touch sensing using a result of analyzing the image.

According to various embodiments of the present disclosure, the controlling of at least the portion of the touch sensor to turn on to sense the touch when an event set for the touch sensor to perform touch sensing is detected may include: controlling at least the portion of the touch sensor to turn on by detecting an event for adding a new object to the AOD screen as the event set to perform touch sensing.

According to various embodiments of the present disclosure, the controlling of at least the portion of the touch sensor to turn on to sense the touch when an event set for the touch sensor to perform touch sensing is detected may include controlling at least the portion of the touch sensor, corresponding to a position of the new object, to turn on, and displaying the screen associated with the object corresponding to a position of the touch in at least the portion of the display may include displaying a screen associated with the new object when the touch is detected in at least the portion of the touch sensor controlled to turn on.

According to various embodiments of the present disclosure, the method for controlling the electronic device may further include: controlling at least a portion of a touch sensor of the electronic device, corresponding to a position of the always on display screen, to turn on; and determining a position of the touch detected in at least the portion of the touch sensor when an event set for the touch sensor to perform touch sensing is detected.

According to various embodiments of the present disclosure, determining the position of the touch detected in at least the portion of the touch sensor when the event set for the touch sensor to perform touch sensing is detected may include: sensing a pressure level of the touch; and determining the position of the touch detected in at least the portion of the touch sensor by detecting a case where the pressure level of the touch exceeds a preset threshold as the event set to perform touch sensing.

According to various embodiments of the present disclosure, determining the position of the touch detected in at least the portion of the touch sensor when the event set for the touch sensor to perform touch sensing is detected may include: capturing an image by photographing a view with the electronic device facing forward; and determining the position of the touch detected in at least the portion of the touch sensor by detecting a case where a user looks at the display as the event set to perform touch sensing using the result of analyzing the captured image.

According to various embodiments of the present disclosure, determining the position of the touch detected in at least the portion of the touch sensor when the event set for the touch sensor to perform touch sensing is detected may include determining the position of the touch detected in at least the portion of the touch sensor by detecting an event for adding a new object to the AOD screen as the event set to perform touch sensing.

According to various embodiments of the present disclosure, the method for controlling the electronic device may further include: ignoring the touch detected in at least the portion of the touch sensor when the event set for the touch sensor to perform touch sensing is not detected.

According to various embodiments of the present disclosure, a method for controlling an electronic device may include: displaying an AOD screen in a first region of a display; controlling the remaining region of the display, other than the first region, to turn off; controlling at least a portion of a touch sensor, corresponding to the position of the AOD screen, to turn on; determining whether contact between a user and the electronic device corresponds to a preset gesture when the touch sensor senses the contact; performing a function associated with an object, corresponding to the contact, included in the AOD screen when the contact corresponds to the preset gesture; and ignoring the contact when the contact does not correspond to the preset gesture.

According to various embodiments of the present disclosure, a storage medium may store commands, wherein the commands may be configured for at least one processor to perform at least one operation when executed by the at least one processor, the at least one operation including: displaying an AOD screen in a first region of a display; controlling the remaining region of the display, other than the first region, to turn off; controlling the entire region of the display to turn on when a touch in the first region is sensed; and displaying a screen associated with an object corresponding to the position of the touch in at least a portion of the display.

According to various embodiments of the present disclosure, a storage medium may store commands, wherein the commands may be configured for at least one processor to perform at least one operation when executed by the at least one processor, the at least one operation including: displaying an AOD screen in a first region of a display; controlling the remaining region of the display, other than the first region, to turn off; controlling at least a portion of a touch sensor, corresponding to the position of the AOD screen, to turn on; determining whether contact between a user and the electronic device corresponds to a preset gesture when the touch sensor senses the contact; performing a function associated with an object, corresponding to the contact, included in the AOD screen when the contact corresponds to the preset gesture; and ignoring the contact when the contact does not correspond to the preset gesture.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. An electronic device comprising:
a display;
a first sensor;
a second sensor; and
a processor,
wherein the processor is configured to:
control a first portion of the display to be turned on and control a remaining portion of the display, other than the first portion, to be turned off such that at least one object is displayed on the first portion of the display,
based on identifying a pressure associated with a touch on the first portion being greater than a threshold value using the first sensor while the at least one object is displayed on the first portion of the display, control the remaining portion of the display to be turned on such that the first portion and the remaining portion of the display are turned on, and
based on identifying an object corresponding to a position of the touch sensed using the second sensor among the at least one object, display a screen associated with the object on the display.

2. The electronic device of claim 1,
wherein the second sensor includes a touch sensor, and
wherein the processor is configured to:
control the touch sensor to be turned off, and
control at least a portion of the touch sensor to be turned on to sense the touch when an event set for the touch sensor to perform touch sensing is detected.

3. The electronic device of claim 2,
wherein the first sensor includes a pressure sensor configured to sense a level of pressure of the touch, and
wherein the processor is configured to:
detect a case where the level of the pressure of the touch exceeds a preset threshold as the event set to perform touch sensing using the pressure sensor, and control at least the portion of the touch sensor to be turned on.

4. The electronic device of claim 2, further comprising:
a camera configured to photograph a view with the electronic device facing forward,
wherein the processor is configured to:
analyze an image captured by the camera,
detect a case where a user looks at the display as the event set to perform touch sensing using a result of analyzing the captured image, and
control at least the portion of the touch sensor to be turned on.

5. The electronic device of claim 2, wherein the processor is configured to:
detect an event for adding a new object on the first portion of the display as the event set to perform touch sensing, and
control at least the portion of the touch sensor to be turned on.

6. The electronic device of claim 5,
wherein the second sensor includes a touch sensor, and
wherein the processor is configured to:
control at least the portion of the touch sensor, corresponding to a position of the new object, to be turned on, and
perform a function associated with the new object when the touch is sensed in at least the portion of the touch sensor controlled to be turned on.

7. The electronic device of claim 1,
wherein the second sensor includes a touch sensor, and
wherein the processor is configured to:
control at least a portion of the touch sensor, to be turned on, and
determine a position of the touch sensed in at least the portion of the touch sensor when an event set for the touch sensor to perform touch sensing is detected.

8. The electronic device of claim 7,
wherein the second sensor includes a touch sensor and the first sensor includes a pressure sensor configured to sense a level of pressure of the touch, and
wherein the processor is configured to:
detect a case where the level of the pressure of the touch exceeds a preset threshold as the event set to perform touch sensing using the pressure sensor, and
determine the position of the touch detected in at least the portion of the touch sensor.

9. The electronic device of claim 7, further comprising:
a camera configured to photograph a view with the electronic device facing forward,
wherein the processor is configured to:
analyze an image captured by the camera,
detect a case where a user looks at the display as the event set to perform touch sensing using a result of analyzing the captured image, and
determine the position of the touch detected in at least the portion of the touch sensor.

10. The electronic device of claim 7, wherein the processor is configured to:
detect an event for adding a new object on the first portion of the display as the event set to perform touch sensing, and
determine the position of the touch detected in at least the portion of the touch sensor.

11. The electronic device of claim 10, wherein the processor is configured to ignore the touch detected in at least the portion of the touch sensor when the event set for the touch sensor to perform touch sensing is not detected.

12. A method for controlling an electronic device, the method comprising:
controlling a first portion of the display to be turned on and control a remaining portion of the display, other than the first portion, to be turned off such that at least one object is displayed on the first portion of the display;
based on identifying a pressure associated with a touch on the first portion being greater than a threshold value using a first sensor while the at least one object is displayed on the first portion of the display, controlling the remaining portion of the display to be turned on such that the first portion and the remaining portion of the display are turned on; and
based on identifying an object corresponding to a position of the touch sensed using a second sensor among the at least one object, displaying a screen associated with the object on the display.

13. The method of claim 12, further comprising:
controlling a touch sensor of the electronic device to be turned off; and
controlling at least a portion of the touch sensor of the electronic device to be turned on to sense the touch when an event set for the touch sensor to perform touch sensing is detected.

14. The method of claim 13, wherein the controlling of at least the portion of the touch sensor to be turned on to sense the touch when an event set for the touch sensor to perform touch sensing is detected comprises:
sensing a level of pressure of the touch; and
controlling at least the portion of the touch sensor to be turned on by detecting a case where the level of the pressure of the touch exceeds a preset threshold as the event set to perform touch sensing.

15. The method of claim 13, wherein the controlling of at least the portion of the touch sensor to be turned on to sense the touch when an event set for the touch sensor to perform touch sensing is detected comprises:
capturing an image by photographing a view with the electronic device facing forward; and
controlling at least the portion of the touch sensor to be turned on by detecting a case where a user looks at the display as the event set to perform touch sensing using a result of analyzing the image.

* * * * *